US012371880B2

(12) United States Patent
Kowatari et al.

(10) Patent No.: US 12,371,880 B2
(45) Date of Patent: Jul. 29, 2025

(54) WORK MACHINE

(71) Applicant: Hitachi Construction Machinery Co., Ltd., Tokyo (JP)

(72) Inventors: Yoichi Kowatari, Kasumigaura (JP); Shuuhei Kofuna, Tsuchiura (JP); Tomoaki Hayashi, Shinagawa-ku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/723,759

(22) PCT Filed: Feb. 7, 2023

(86) PCT No.: PCT/JP2023/004058
§ 371 (c)(1),
(2) Date: Jun. 24, 2024

(87) PCT Pub. No.: WO2023/162684
PCT Pub. Date: Aug. 31, 2023

(65) Prior Publication Data

US 2025/0059728 A1 Feb. 20, 2025

(30) Foreign Application Priority Data

Feb. 24, 2022 (JP) ................................. 2022-026846
Feb. 24, 2022 (JP) ................................. 2022-026879

(51) Int. Cl.
*E02F 9/22* (2006.01)
*E02F 3/32* (2006.01)
(Continued)

(52) U.S. Cl.
CPC .............. *E02F 9/2235* (2013.01); *E02F 3/32* (2013.01); *E02F 9/2203* (2013.01);
(Continued)

(58) Field of Classification Search
CPC ......... E02F 3/32; E02F 9/2203; E02F 9/2289; E02F 9/2235
See application file for complete search history.

(56) References Cited

U.S. PATENT DOCUMENTS

2014/0345265 A1 11/2014 Akiyama et al.
2015/0013320 A1 1/2015 Akiyama et al.
(Continued)

FOREIGN PATENT DOCUMENTS

JP 2013-174325 A 9/2013
JP 2014-20431 A 2/2014
(Continued)

OTHER PUBLICATIONS

International Search Report (PCT/ISA/210) issued in PCT Application No. PCT/JP2023/004058 dated Mar. 28, 2023 with English translation (5 pages).
(Continued)

*Primary Examiner* — Abiy Teka
(74) *Attorney, Agent, or Firm* — Crowell & Moring LLP

(57) ABSTRACT

A work machine includes: a hydraulic actuator; a closed-circuit pump that is connected to the hydraulic actuator in a closed circuit, and supplies and discharges a hydraulic working fluid to and from the hydraulic actuator; an open-circuit pump that is connected to the hydraulic actuator in an open circuit, and supplies the hydraulic working fluid to the hydraulic actuator; a charge pump; a charge flow path that introduces the hydraulic working fluid delivered from the charge pump to the closed circuit; an excess fluid discharging device that discharges an excess hydraulic working fluid of the closed circuit to the charge flow path; and a controller that controls a delivery capacity of the closed-circuit pump and a delivery capacity of the open-circuit pump. The controller increases the delivery capacity of the open-circuit pump, or reduces the delivery capacity of the closed-circuit
(Continued)

pump when a state of a pressure of the charge flow path has transited to be lower than a predetermined pressure threshold from equal to or higher than the predetermined pressure threshold, or when a state of the work device has transited to a state of performing the excavation work from a state of not-performing the excavation work.

10 Claims, 14 Drawing Sheets

(51) Int. Cl.
*E02F 9/26* (2006.01)
*F15B 15/18* (2006.01)
*F15B 19/00* (2006.01)

(52) U.S. Cl.
CPC .......... *E02F 9/2289* (2013.01); *E02F 9/2292* (2013.01); *E02F 9/2296* (2013.01); *E02F 9/265* (2013.01); *F15B 15/18* (2013.01); *F15B 19/00* (2013.01)

(56) References Cited

U.S. PATENT DOCUMENTS

2016/0076558 A1 3/2016 Gomm et al.
2016/0177539 A1* 6/2016 Hiraku .................... F15B 11/10 60/428
2021/0262201 A1* 8/2021 Saitoh ................... E02F 9/2289
2023/0349132 A1 11/2023 Sugiki et al

FOREIGN PATENT DOCUMENTS

JP 2019-178760 A 10/2019
JP 2021-32361 A 3/2021

OTHER PUBLICATIONS

Japanese-language Written Opinion (PCT/ISA/237) issued in PCT Application No. PCT/JP2023/004058 dated Mar. 28, 2023 with English translation (7 pages).
Japanese-language International Preliminary Report on Patentability (PCT/IPEA/409) issued in PCT Application No. PCT/JP2023/004058 dated Feb. 22, 2024, including Annexes with partial English Translation (18 pages).
International Preliminary Report on Patentability (PCT/IB/338) issued in PCT Application No. PCT/JP2023/004058 dated Aug. 29, 2024, including English translation of document C3 (Japanese International Preliminary Report on Patentability (PCT/IPEA/409), filed on Jun. 24, 2024) (4 pages).

* cited by examiner

WORK MACHINE

TECHNICAL FIELD

The present invention relates to a work machine.

BACKGROUND ART

There is a known work machine including: a hydraulic working fluid flow path configuring a closed circuit between a hydraulic pump and a hydraulic cylinder; and a charge circuit connected to the hydraulic working fluid flow path in order to compensate for a shortfall in a hydraulic working fluid of the closed circuit, which shortfall is caused by a pressure-receiving area difference between the rod-side fluid chamber and the bottom-side fluid chamber of the hydraulic cylinder (see Patent Document 1). The charge circuit described in Patent Document 1 has: a charge flow path connected to the hydraulic working fluid flow path; and a charge pump that delivers the hydraulic working fluid to the charge flow path, and the charge circuit adds the hydraulic working fluid to the hydraulic working fluid flow path when the pressure of the hydraulic working fluid flow path has become lower than the pressure of the charge flow path.

PRIOR ART DOCUMENT

Patent Document

Patent Document 1: JP-2013-174325-A

SUMMARY OF THE INVENTION

Problem to be Solved by the Invention

In the case of the work machine described in Patent Document 1, when a bucket hits a hard soil or the like during excavation, and an action of the hydraulic cylinder is restricted, a return fluid from the hydraulic cylinder decreases, and the pressure of the hydraulic working fluid flow path lowers. When the pressure of the hydraulic working fluid flow path becomes lower than the pressure of the charge flow path, the hydraulic working fluid is added from the charge circuit to the hydraulic working fluid flow path, but there can be a case where the amount of the added fluid momentarily falls short of a required flow rate of the fluid that should be supplied to the closed-circuit pump. In this case, the pressures of the charge flow path and the hydraulic working fluid flow path become negative pressures, and it is likely that cavitation occurs. In addition, there is a fear that a lot of repetition of the occurrence of such states accelerates the aging of the closed-circuit pump.

An object of the present invention is to provide a work machine that can inhibit the deterioration of a closed-circuit pump.

Means for Solving the Problem

A work machine according to an aspect of the present invention includes: an articulated work device that has a hydraulic actuator, and performs an excavation work; a closed-circuit pump that is connected to the hydraulic actuator in a closed circuit, and supplies and discharges a hydraulic working fluid to and from the hydraulic actuator; an open-circuit pump that is connected to the hydraulic actuator in an open circuit, and supplies the hydraulic working fluid to the hydraulic actuator; a charge pump; a charge flow path that introduces the hydraulic working fluid delivered from the charge pump to the closed circuit; and a controller that controls a delivery capacity of the closed-circuit pump and a delivery capacity of the open-circuit pump. In addition, the work machine includes an excess fluid discharging device that discharges an excess hydraulic working fluid of the closed circuit to the charge flow path. The controller is configured to increase the delivery capacity of the open-circuit pump when a state of a pressure of the charge flow path has transited to be lower than a predetermined pressure threshold from equal to or higher than the predetermined pressure threshold, or when a state of the work device has transited to a state of performing the excavation work from a state of not-performing the excavation work.

Advantages of the Invention

The present invention can provide a work machine that can inhibit the deterioration of a closed-circuit pump.

MODES FOR CARRYING OUT THE INVENTION

A work machine according to embodiments of the present invention is explained with reference to the figures.

First Embodiment

Figure 1:
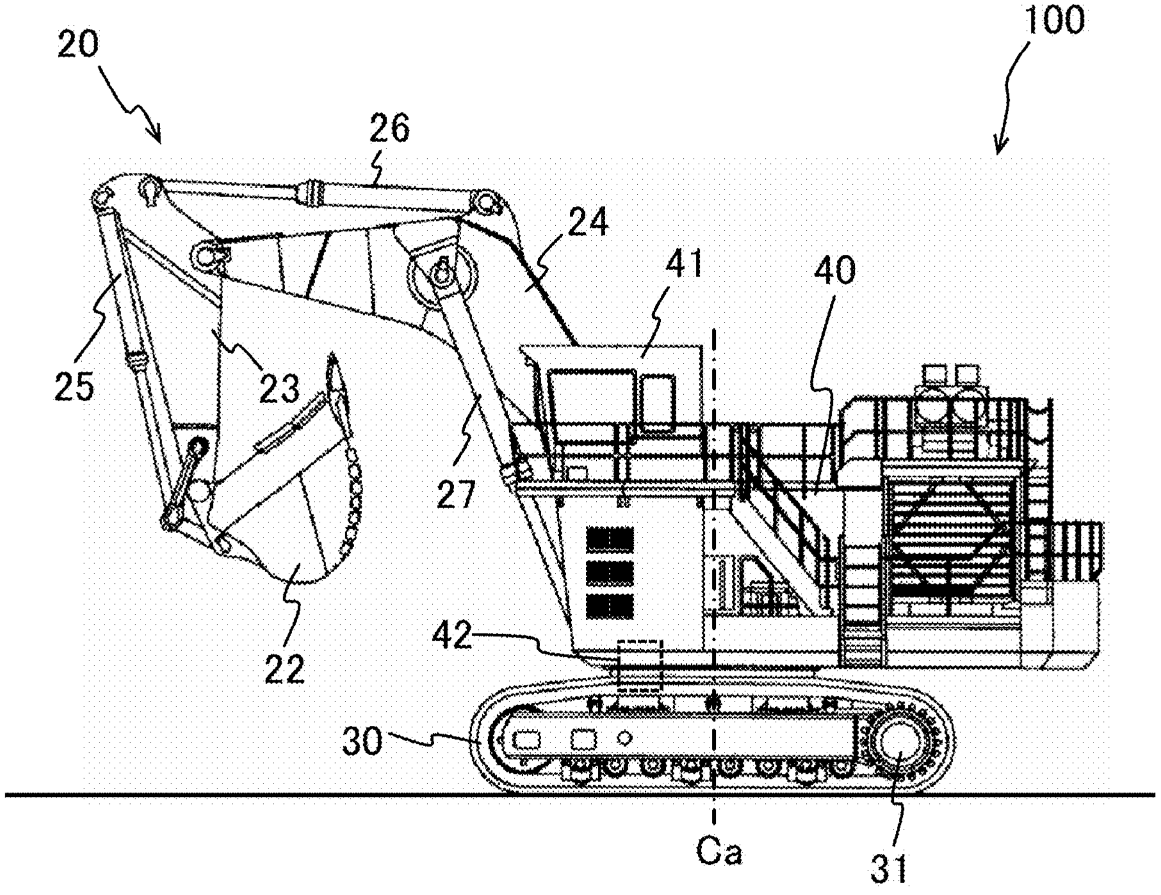
FIG. 1 is a side view of a hydraulic excavator depicted as an example of a work machine according to a first embodiment of the present invention.

FIG. 1 is a side view of a hydraulic excavator 100 depicted as an example of a work machine according to a first embodiment of the present invention. As depicted in FIG. 1, the hydraulic excavator 100 includes: a crawler-type travel structure 30; a swing structure (machine body) 40 provided swingably relative to the travel structure 30; and a front work device (hereinafter, written as a work device) 20 that is attached to the swing structure 40, and performs an excavation work. Note that, the present invention can be applied to various work machines, other than the hydraulic excavator 100, and a construction machine such as a wheel loader that perform the excavation work using a work device at a construction site, a mining site, or the like.

The travel structure 30 is provided with a pair of left and right travel hydraulic motors (hereinafter, written as travel motors) 31. The left and right travel motors 31 rotation-drive left and right crawlers independently. Thereby, the travel structure 30 travels forward or backward.

The swing structure 40 is provided with an operation room 41 in which operation devices for performing various types of operation of the hydraulic excavator 100, an operator's seat where an operator is to be seated, and the like are arranged. The operation devices include an operation device for operating the work device 20, an operation device for operating the travel structure 30, and an operation device for operating the swing structure 40.

In addition, a prime mover such as an engine, a hydraulic pump driven by the engine, a swing hydraulic motor (hereinafter, written as a swing motor) 42, and the like are mounted on the swing structure 40. The swing structure 40 is swung rightward or leftward relative to the travel structure 30 by the swing motor 42.

The work device 20 is an articulated work device attached to the swing structure 40, and has a plurality of hydraulic actuators (hydraulic cylinders), and a plurality of driven members (three driven members in the present embodiment) that are driven by the plurality of hydraulic actuators. A boom 24, an arm 23, and a bucket 22, which are the driven members, are coupled in series. The base end of the boom 24 is pivotably coupled to the front of the swing structure 40 via a boom pin. The base end of the arm 23 is pivotably coupled to the leading end of the boom 24 via an arm pin. The bucket 22 is pivotably coupled to the leading end of the arm 23 via a bucket pin.

The boom 24 is rotation-driven by an extension/contraction action of a boom cylinder 27, which is a hydraulic cylinder. The arm 23 is rotation-driven by an extension/contraction action of an arm cylinder 26, which is a hydraulic cylinder. The bucket 22 is rotation-driven by an extension/contraction action of a bucket cylinder 25, which is a hydraulic cylinder. The boom cylinder 27 has one end side connected to the boom 24, and has another end side connected to the frame of the swing structure 40. The arm cylinder 26 has one end side connected to the arm 23, and has another end side connected to the boom 24. The bucket cylinder 25 has one end side connected to the bucket 22 via a bucket link, and has another end side connected to the arm 23.

Figure 2:
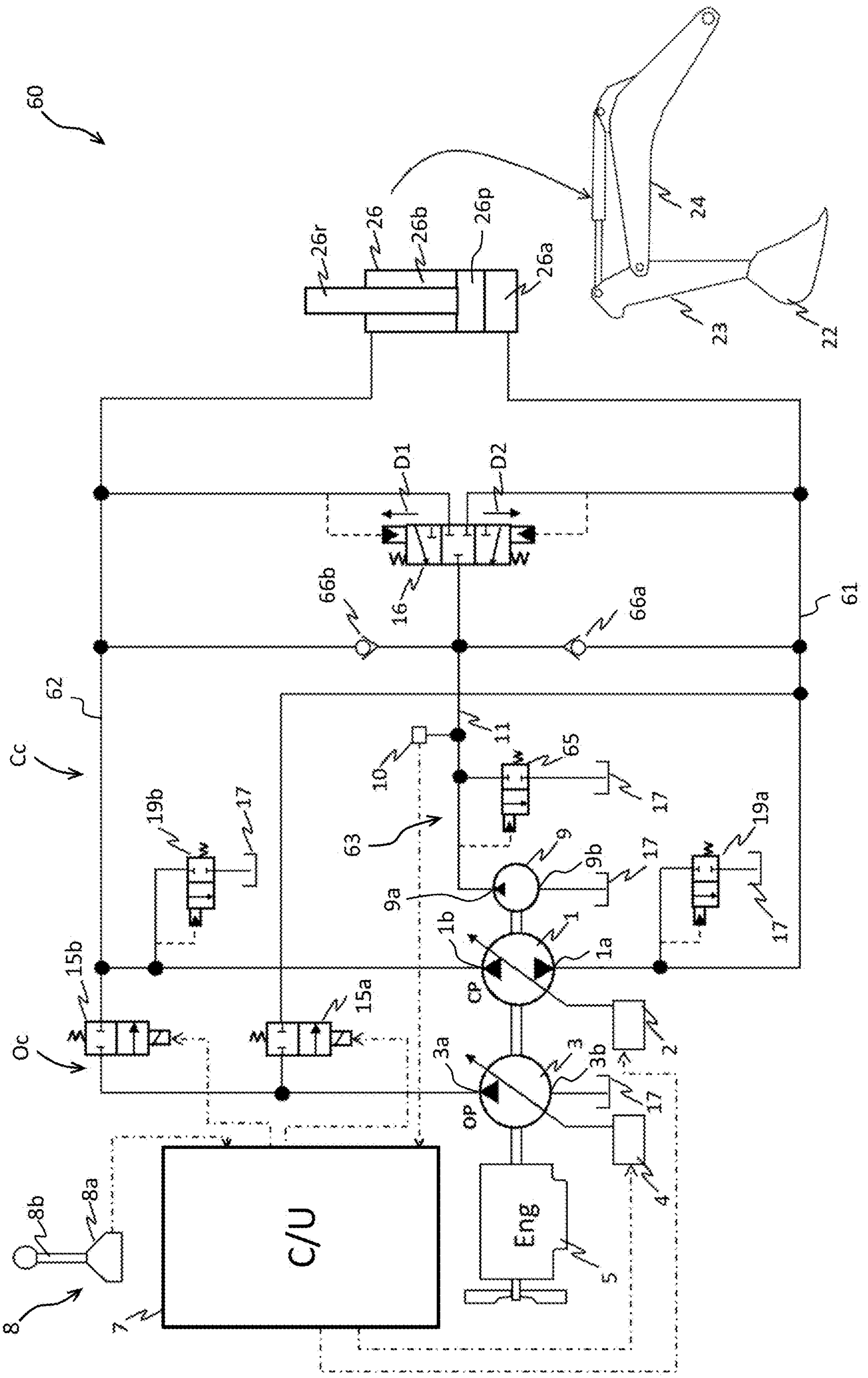
FIG. 2 is a figure depicting a hydraulic system mounted on the hydraulic excavator.

FIG. 2 is a figure depicting a hydraulic system 60 mounted on the hydraulic excavator 100. The hydraulic system 60 includes a plurality of hydraulic circuits for driving a plurality of hydraulic actuators (25 to 27, 31, and 42).

Note that FIG. 2 depicts a hydraulic circuit that drives the arm cylinder 26, and hydraulic circuits that drive the other hydraulic actuators (25, 27, 31, and 42) are omitted in the figure.

The arm cylinder 26 includes: a bottomed cylindrical cylinder tube having one closed end; a head cover that covers an opening at the other end of the cylinder tube; a cylinder rod 26*r* that penetrates the head cover, and is inserted into the cylinder tube; and a piston 26*p* that is provided at the leading end of the cylinder rod 26*r*, and partitions the inside of the cylinder tube into a rod-side fluid chamber 26*b* and a bottom-side fluid chamber 26*a*.

As depicted in FIG. 2, the hydraulic system 60 includes: a closed-circuit pump 1 that is connected to the arm cylinder 26 in a closed circuit Cc, and supplies and discharges a hydraulic working fluid to and from the arm cylinder 26; an open-circuit pump 3 that is connected to the arm cylinder 26 in an open circuit Oc, and supplies the hydraulic working fluid to the arm cylinder 26; an operation device 8 that gives an instruction about an action of the arm cylinder 26; and a controller 7 that controls the delivery capacities (displacement volumes) of the closed-circuit pump 1 and the open-circuit pump 3.

The operation device 8 is one of operation devices for operating the work device 20. Delivery capacity is a delivery amount of a pump per rotation. Note that the closed circuit Cc is a circuit in which a return fluid from the hydraulic actuator returns to the pump. In addition, the open circuit Oc is a circuit in which the return fluid from the hydraulic actuator does not return to the pump, and, for example, is a circuit configured such that the return fluid from the hydraulic actuator returns to a tank (not depicted).

In addition, the hydraulic system 60 includes a first selector valve 15*a*, a second selector valve 15*b*, a first relief valve 19*a*, a second relief valve 19*b*, a flushing valve 16, a charge circuit 63, a tank 17, and an engine 5.

The closed-circuit pump 1 and the open-circuit pump 3 are rotation-driven by the engine 5, and deliver the hydraulic working fluid. The engine 5 is a motive power source of the hydraulic excavator 100, and, for example, includes an internal combustion engine such as a diesel engine. The hydraulic working fluid is stored in the tank 17.

The closed-circuit pump 1 is a variable displacement hydraulic pump having delivery capacity (displacement volume) that can be varied. For example, the closed-circuit pump 1 is a swash plate type hydraulic pump or a bent axis type hydraulic pump.

The delivery capacity of the closed-circuit pump 1 is controlled by a closed-circuit pump regulator (hereinafter, written as a first regulator) 2. The first regulator 2 controls the delivery capacity of the closed-circuit pump 1 by controlling the tilting angle of the swash plate or the bent axis of the closed-circuit pump 1 on the basis of a control signal from the controller 7. The delivery flow rate of the closed-circuit pump 1 is determined according to the delivery capacity of the closed-circuit pump 1 and the rotation speed of the engine 5.

The closed-circuit pump 1 is a bidirectionally-tiltable hydraulic pump that can deliver the hydraulic working fluid in two directions. The closed-circuit pump 1 has a first pump port 1*a* and a second pump port 1*b*. The closed-circuit pump 1 can switch to a first delivery state and a second delivery state. In the first delivery state, the closed-circuit pump 1 sucks in the hydraulic working fluid from the second pump port 1*b*, and delivers the hydraulic working fluid from the first pump port 1*a*. In the second delivery state, the closed-circuit pump 1 sucks in the hydraulic working fluid from the first pump port 1*a*, and delivers the hydraulic working fluid from the second pump port 1*b*.

The first pump port 1*a* of the closed-circuit pump 1 and the bottom-side fluid chamber 26*a* of the arm cylinder 26 are connected by a first flow path 61. The second pump port 1*b* of the closed-circuit pump 1 and the rod-side fluid chamber 26*b* of the arm cylinder 26 are connected by a second flow path 62. In the present embodiment, the closed circuit Cc is formed by connecting the closed-circuit pump 1 and the arm cylinder 26 using the first flow path 61 and the second flow path 62.

The open-circuit pump 3 is a variable displacement that can be varied. For example, the open-circuit pump 3 is a swash plate type hydraulic pump or a bent axis type hydraulic pump.

The delivery capacity of the open-circuit pump 3 is controlled by an open-circuit pump regulator (hereinafter, written as a second regulator) 4. The second regulator 4 controls the delivery capacity of the open-circuit pump 3 by controlling the tilting angle of the swash plate or the bent axis of the open-circuit pump 3 on the basis of a control signal from the controller 7. The delivery flow rate of the open-circuit pump 3 is determined according to the delivery capacity of the open-circuit pump 3 and the rotation speed of the engine 5.

The open-circuit pump 3 is a unidirectionally-tiltable hydraulic pump that can deliver the hydraulic working fluid in one direction. The open-circuit pump 3 has a pump port 3*a* and a suction port 3*b*. The open-circuit pump 3 sucks in the hydraulic working fluid in the tank 17 from the suction port 3*b*, and delivers the hydraulic working fluid from the pump port 3*a*.

The pump port 3*a* of the open-circuit pump 3 is connected to the first flow path 61 via the first selector valve 15*a*. In addition, the pump port 3*a* of the open-circuit pump 3 is connected to the second flow path 62 via the second selector valve 15*b*.

For example, the first selector valve 15*a* and the second selector valve 15*b* are 2-port, 2-position solenoid selector valves. The first selector valve 15*a* and the second selector valve 15*b* are switched to open positions or closed positions on the basis of control signals from the controller 7. When not supplied with currents, the first selector valve 15*a* and the second selector valve 15*b* are switched to the closed positions due to the urging forces of springs.

When the first selector valve 15*a* is switched to the open position, the first selector valve 15*a* establishes communication between the delivery flow path of the open-circuit pump 3 and the first flow path 61. When the first selector valve 15*a* is switched to the closed position, the first selector valve 15*a* interrupts the communication between the delivery flow path of the open-circuit pump 3 and the first flow path 61.

When the second selector valve 15*b* is switched to the open position, the second selector valve 15*b* establishes communication between the delivery flow path of the open-circuit pump 3 and the second flow path 62. When the second selector valve 15*b* is switched to the closed position, the second selector valve 15*b* interrupts the communication between the delivery flow path of the open-circuit pump 3 and the second flow path 62.

The first relief valve 19*a* is connected to the first flow path 61, and defines the maximum pressure of the first flow path 61. The second relief valve 19*b* is connected to the second flow path 62, and defines the maximum pressure of the second flow path 62.

The charge circuit 63 has: a charge pump 9; a charge flow path 11 that introduces the hydraulic working fluid delivered from the charge pump 9 to the closed circuit Cc through a first makeup valve 66*a* or a second makeup valve 66*b*; and a charge relief valve 65 that defines the maximum pressure of the charge flow path 11.

The charge pump 9 is a fixed displacement hydraulic pump having fixed delivery capacity. For example, the charge pump 9 is a gear pump. The charge pump 9 is driven by the engine 5, and sucks in and delivers the hydraulic working fluid in the tank 17.

For example, the set pressure of the charge relief valve 65 is set to approximately 2 MPa. The charge relief valve 65 discharges an excess amount of the hydraulic working fluid delivered from the charge pump 9 to the tank 17, and maintains the pressure of the charge flow path 11 at 2 MPa.

A pump port 9*a* of the charge pump 9 is connected to the charge flow path 11, and a suction port 9*b* of the charge pump 9 is connected to the tank 17.

The charge flow path 11 is connected to the first flow path 61 via the first makeup valve 66*a*. The first makeup valve 66*a* is a check valve that permits the hydraulic working fluid to flow from the charge flow path 11 to the first flow path 61, and prohibits the hydraulic working fluid from flowing from the first flow path 61 to the charge flow path 11.

In addition, the charge flow path 11 is connected to the second flow path 62 via the second makeup valve 66*b*. The second makeup valve 66*b* is a check valve that permits the hydraulic working fluid to flow from the charge flow path 11 to the second flow path 62, and prohibits the hydraulic working fluid from flowing from the second flow path 62 to the charge flow path 11.

The charge pump 9 sucks in the hydraulic working fluid from the tank 17, and delivers the hydraulic working fluid to the charge flow path 11. The hydraulic working fluid delivered from the charge pump 9 to the charge flow path 11 is added to the closed circuit Cc through the first makeup valve 66*a* or the second makeup valve 66*b*.

The flushing valve 16 is an excess fluid discharging device that is connected to the first flow path 61, the second flow path 62, and the charge flow path 11, and discharges an excess hydraulic working fluid (hereinafter, written also as excess fluid) in the closed circuit Cc to the charge flow path 11.

The flushing valve 16 establishes communication between the charge flow path 11 and a flow path with higher pressure between the first flow path 61 and the second flow path 62. Where the pressure of the first flow path 61 is higher than the pressure of the second flow path 62, the flushing valve 16 moves in a first direction D1, and the flushing valve 16 establishes communication between the first flow path 61 and the charge flow path 11. Where the pressure of the second flow path 62 is higher than the pressure of the first flow path 61, the flushing valve 16 moves in a second direction D2, and the flushing valve 16 establishes communication between the second flow path 62 and the charge flow path 11.

The operation device 8 has an inclinable operation lever 8*b*, and an operation amount sensor 8*a* that senses the operation amount (inclination angle) of the operation lever 8*b*. The operation amount sensor 8*a* is electrically connected to the controller 7. The operation amount sensor 8*a* senses the operation amount of the operation lever 8*b*, and outputs a signal representing a result of the sensing to the controller 7.

The controller 7 is electrically connected with a pressure sensor 10, the first regulator 2, the second regulator 4, the first selector valve 15*a*, and the second selector valve 15*b*. The pressure sensor 10 senses the pressure (hereinafter, written also as a charge pressure) Pc of the charge flow path 11, and outputs a signal representing a result of the sensing to the controller 7. The controller 7, on the basis of the sensing results of the operation amount sensor 8*a* and the pressure sensor 10, outputs control signals to the first regulator 2 and the second regulator 4, and to the first selector valve 15*a* and the second selector valve 15*b*.

Figure 3:
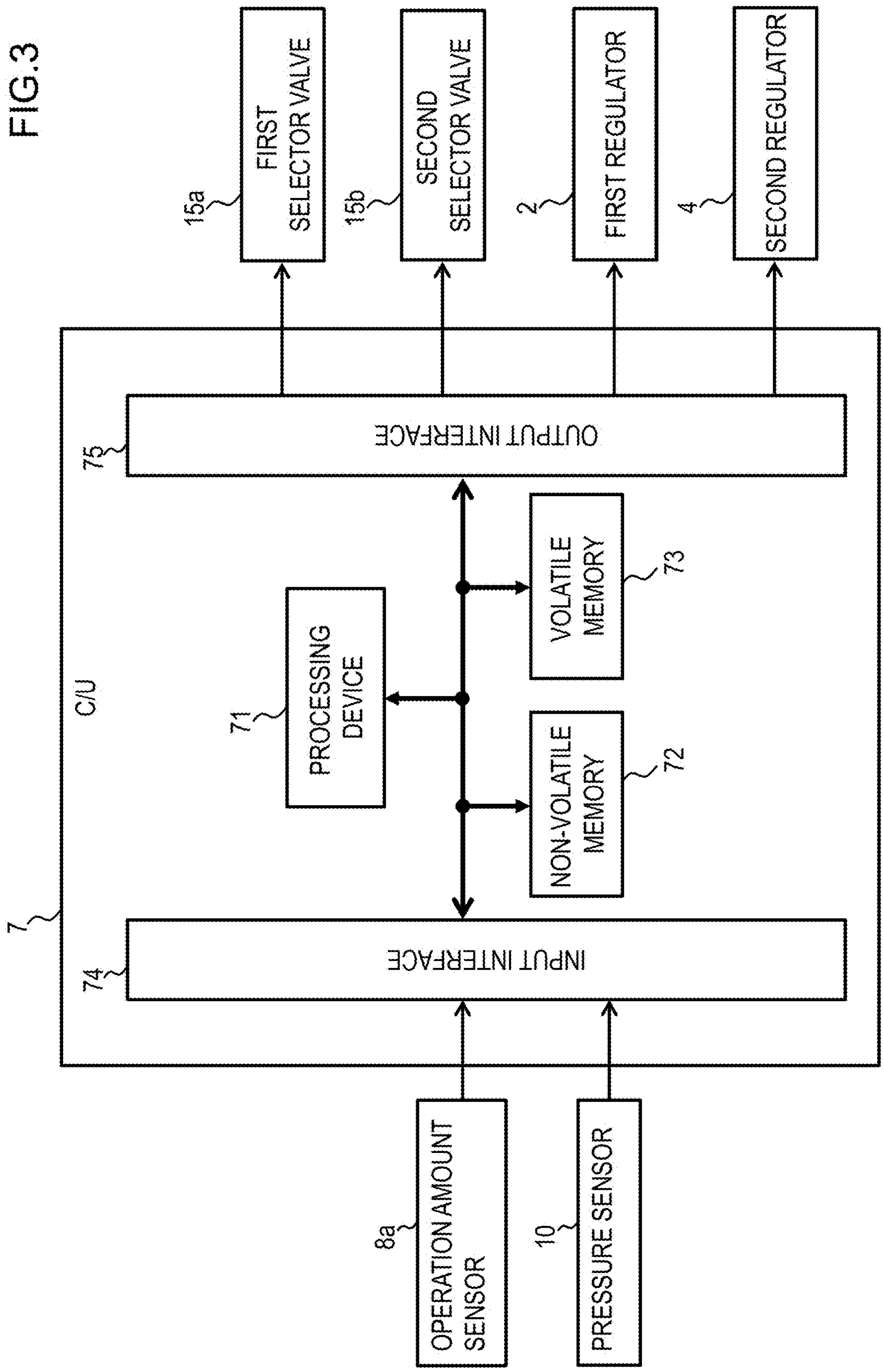
FIG. 3 is a hardware configuration diagram of a controller.

FIG. 3 is a hardware configuration diagram of the controller 7. As depicted in FIG. 3, the controller 7 is configured by using a computer including: a processing device 71 such as a CPU (Central Processing Unit), an MPU (Micro Processing Unit), or a DSP (Digital Signal Processor); a non-volatile memory 72 such as a ROM (Read Only Memory), a flash memory, or a hard disk drive; a volatile memory 73 which is commonly called a RAM (Random Access Memory); an input interface 74; an output interface 75; and other peripheral circuits. Note that the controller 7 may be configured by using one computer, or may be configured by using a plurality of computers. In addition, as the processing device 71, an ASIC (application specific integrated circuit), an FPGA (Field Programmable Gate Array), or the like can be used.

The non-volatile memory 72 has stored thereon programs that can execute various types of computation. That is, the non-volatile memory 72 is a storage medium from which programs to realize functions of the present embodiment can be read out.

The processing device 71 deploys, to the volatile memory 73, a program stored on the non-volatile memory 72, and executes computation thereof. In accordance with the program, the processing device 71 performs a predetermined computation process on signals taken in from the input interface 74, the non-volatile memory 72, and the volatile memory 73.

The input interface 74 converts signals input from various types of device (the operation amount sensor 8*a*, the pressure sensor 10, etc.) into data on which computation can be performed by the processing device 71. In addition, the output interface 75 generates output signals corresponding to results of computation performed by the processing device 71, and outputs the signals to various types of device (the first selector valve 15*a*, the second selector valve 15*b*, the first regulator 2, the second regulator 4, etc.).

Figure 4:
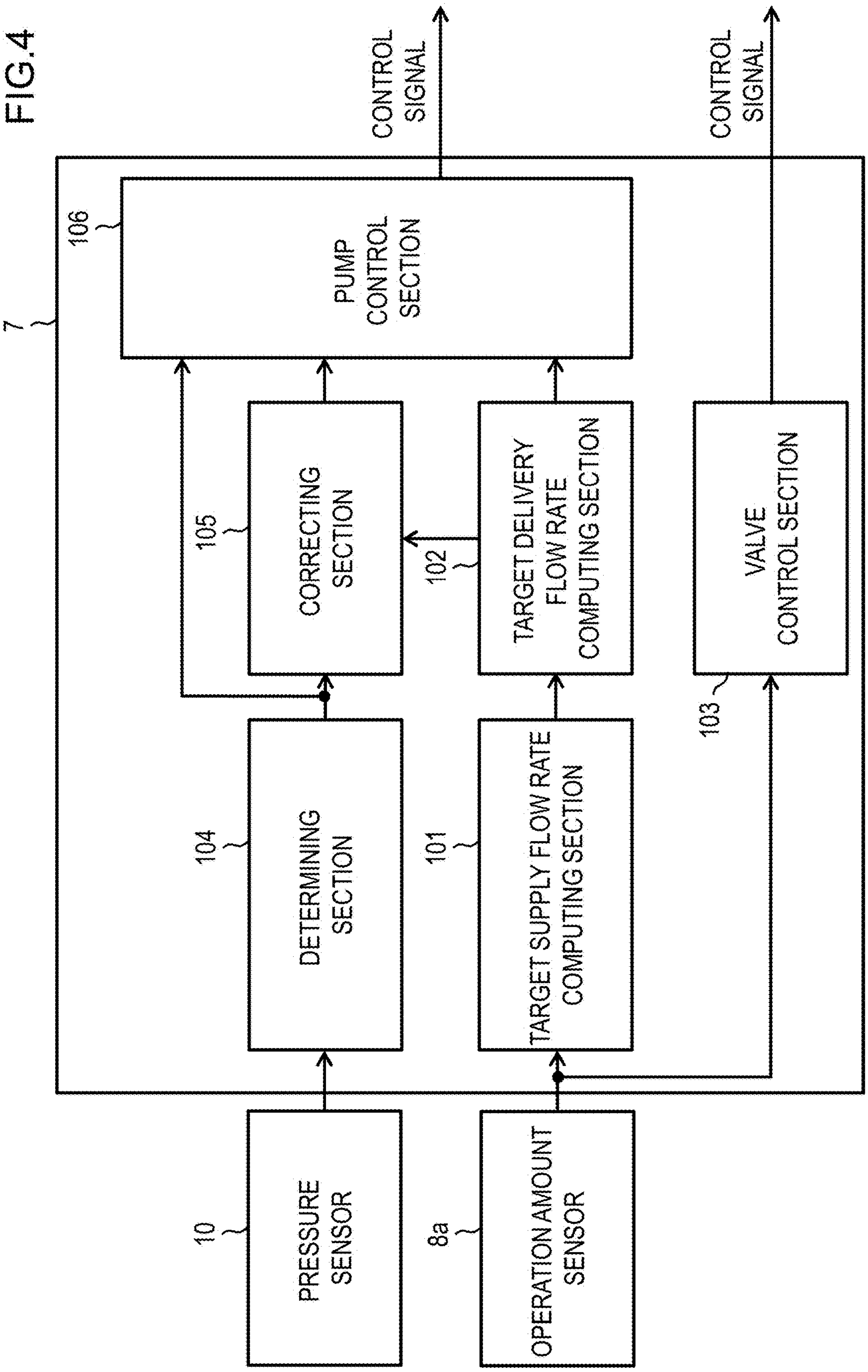
FIG. 4 is a functional block diagram of the controller.

FIG. 4 is a functional block diagram of the controller 7. As depicted in FIG. 4, the controller 7, by executing programs stored on the non-volatile memory 72, functions as a target supply flow rate computing section 101, a target delivery flow rate computing section 102, a valve control section 103, a determining section 104, a correcting section 105, and a pump control section 106.

Note that, for convenience of explanation, a case where the rotation speed of the engine 5 is a fixed value is explained hereinbelow. As described above, the delivery flow rates of the closed-circuit pump 1 and the open-circuit pump 3 are determined according to the delivery capacities and the rotation speed of the engine 5. The controller 7 controls the delivery flow rates of the closed-circuit pump 1 and the open-circuit pump 3 by controlling the delivery capacities of the closed-circuit pump 1 and the open-circuit pump 3.

The target supply flow rate computing section 101, on the basis of the operation amount sensed by the operation amount sensor 8*a*, computes a target value (hereinafter, written as a target supply flow rate) of the flow rate of the hydraulic working fluid to be supplied to the arm cylinder 26.

The non-volatile memory 72 has stored thereon a supply flow rate table that defines the relationship between the operation amount and the target supply flow rate. The supply flow rate table defines such supply flow rate characteristics that the target supply flow rate increases as the operation amount increases.

The target supply flow rate computing section 101 refers to the supply flow rate table stored on the non-volatile memory 72, and computes the target supply flow rate on the basis of the operation amount sensed by the operation amount sensor 8*a*.

The target delivery flow rate computing section 102, on the basis of the target supply flow rate computed by the target supply flow rate computing section 101, computes a target flow rate Q1, which is a target value of the delivery flow rate of the closed-circuit pump 1, and a target flow rate Q2, which is a target value of the delivery flow rate of the open-circuit pump 3.

Figure 5:
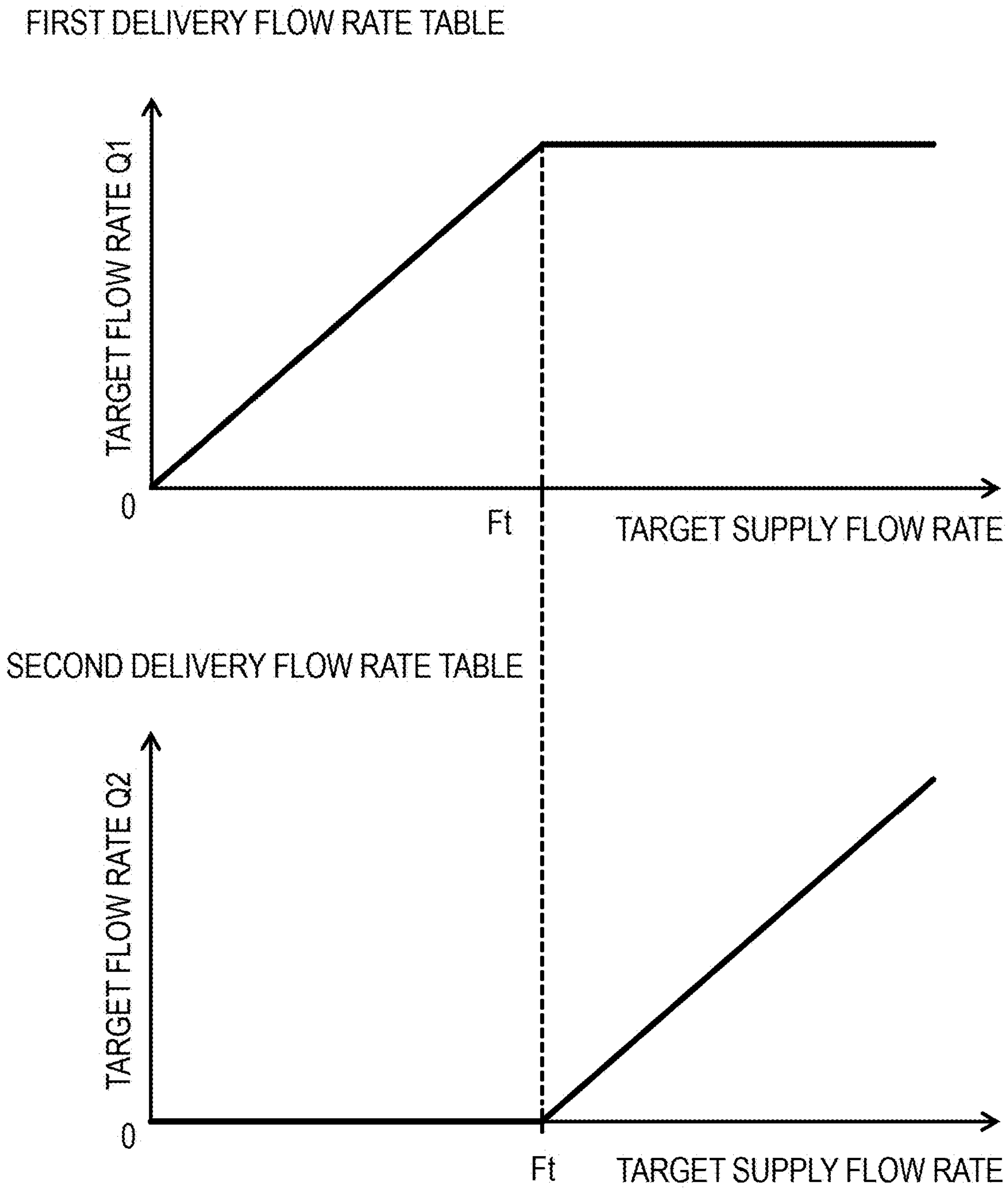
FIG. 5 is a figure depicting a first delivery flow rate table and a second delivery flow rate table stored on a non-volatile memory.

The non-volatile memory 72 has stored thereon a first delivery flow rate table and a second delivery flow rate table depicted in FIG. 5. The first delivery flow rate table defines the relationship between the target supply flow rate and the target flow rate Q1. The second delivery flow rate table defines the relationship between the target supply flow rate and the target flow rate Q2.

The first delivery flow rate table defines such delivery flow rate characteristics that the target flow rate Q1 increases as the target supply flow rate increases within the range of 0 to a predetermined value Ft of the target supply flow rate. The second delivery flow rate table defines such delivery flow rate characteristics that the target flow rate Q2 is 0 when the target supply flow rate is smaller than the predetermined value Ft, and the target flow rate Q2 increases as the target supply flow rate increases when the target supply flow rate is equal to or higher than the predetermined value Ft. That is, the arm cylinder 26 (operated hydraulic actuator) is driven by the hydraulic working fluid delivered from the closed-circuit pump 1 within the range of 0 to the predetermined value Ft of the target supply flow rate. On the other hand, where the target supply flow rate is equal to or higher than the predetermined value Ft, the arm cylinder 26 is driven by the hydraulic working fluid (total flow rate) delivered from both the closed-circuit pump 1 and the open-circuit pump 3.

The target delivery flow rate computing section 102 refers to the first delivery flow rate table stored on the non-volatile memory 72, and computes the target flow rate Q1 of the closed-circuit pump 1 on the basis of the target supply flow rate computed by the target supply flow rate computing section 101. The target delivery flow rate computing section 102 refers to the second delivery flow rate table stored on the non-volatile memory 72, and computes the target flow rate Q2 of the open-circuit pump 3 on the basis of the target supply flow rate computed by the target supply flow rate computing section 101.

As depicted in FIG. 4, the valve control section 103 identifies the operation direction of the operation lever 8*b* on the basis of a sensing result of the operation amount sensor 8*a*.

The valve control section 103, when the operation direction of the operation lever 8*b* is an arm crowding direction, outputs an ON signal to the first selector valve 15*a*, and also outputs an OFF signal to the second selector valve 15*b*. Thereby, the first selector valve 15*a* gets positioned at the open position, and the second selector valve 15*b* gets positioned at the closed position.

The valve control section 103, when the operation direction of the operation lever 8*b* is an arm dumping direction, outputs an ON signal to the second selector valve 15*b*, and also outputs an OFF signal to the first selector valve 15*a*. Thereby, the second selector valve 15*b* gets positioned at the open position, and the first selector valve 15*a* gets positioned at the closed position.

Note that the ON signals are equivalent to control signals (control currents) for exciting the solenoids of the first selector valve 15*a* and the second selector valve 15*b*, and switching the first selector valve 15*a* and the second selector valve 15*b* to the open positions. The OFF signals are control signals (control currents) equivalent to standby currents.

The determining section 104 determines whether or not the charge pressure Pc sensed by the pressure sensor 10 is lower than a pressure threshold Pc0. For example, the pressure threshold Pc0 is equal to or lower than a set pressure of the charge relief valve 65, and is set to any value which is equal to or higher than such a pressure that cavitation does not occur in the closed-circuit pump 1.

The charge pressure Pc lowers in a case where the charge circuit 63 no longer can sufficiently add the hydraulic working fluid to the closed circuit. The determining section 104 monitors sensing results of the pressure sensor 10, and senses that the charge pressure Pc has lowered to be lower than the pressure threshold Pc0 from equal to or higher than the pressure threshold Pc0. That is, the determining section 104 has a function to sense that the charge circuit 63 no longer can sufficiently add the hydraulic working fluid to the closed circuit, on the basis of a sensing result of the pressure sensor 10.

When the determining section 104 determines that the charge pressure Pc is lower than the pressure threshold Pc0, the correcting section 105 computes a correction target flow rate Q2c on the basis of the target flow rate Q1 of the closed-circuit pump 1 and the delivery flow rate Q3 of the charge pump 9.

In the present embodiment, the correction target flow rate Q2c is computed in accordance with the following Formula (1).

$$Q2c = Q1 - Q3 \quad (1)$$

Q1 is the target flow rate of the closed-circuit pump 1 computed by the target delivery flow rate computing section 102, and Q3 is the delivery flow rate of the charge pump 9. The delivery flow rate Q3 of the charge pump 9 is stored on the non-volatile memory 72.

The pump control section 106 outputs, to the first regulator 2, a control signal for making the delivery flow rate of the closed-circuit pump 1 the target flow rate Q1 computed by the target delivery flow rate computing section 102. That is, the pump control section 106 controls the delivery capacity of the closed-circuit pump 1 via the first regulator 2 such that the delivery flow rate of the closed-circuit pump 1 becomes the target flow rate Q1.

When the determining section 104 determines that the charge pressure Pc is equal to or higher than the pressure threshold Pc0, the pump control section 106 outputs, to the second regulator 4, a control signal for making the delivery flow rate of the open-circuit pump 3 the target flow rate Q2 computed by the target delivery flow rate computing section 102. That is, the pump control section 106 controls the delivery capacity of the open-circuit pump 3 via the second regulator 4 such that the delivery flow rate of the open-circuit pump 3 becomes the target flow rate Q2.

When the determining section 104 determines that the charge pressure Pc is lower than the pressure threshold Pc0, the pump control section 106 outputs, to the second regulator 4, a control signal for making the delivery flow rate of the open-circuit pump 3 the correction target flow rate Q2c computed by the correcting section 105. That is, the pump control section 106 controls the delivery capacity of the open-circuit pump 3 via the second regulator 4 such that the delivery flow rate of the open-circuit pump 3 becomes the correction target flow rate Q2c.

When the charge pressure Pc has lowered to be lower than the pressure threshold Pc0 from equal to or higher than the pressure threshold Pc0, the pump control section 106 increases the delivery capacity of the open-circuit pump 3 as compared to that before the charge pressure Pc has lowered to be lower than the pressure threshold Pc0. Thereby, the delivery flow rate of the open-circuit pump 3 increases.

Note that, when the charge pressure Pc has risen to be equal to or higher than the pressure threshold Pc0 from lower than the pressure threshold Pc0, the pump control section 106 reduces the delivery capacity of the open-circuit pump 3 as compared to that before the charge pressure Pc has risen to be equal to or higher than the pressure threshold Pc0. Thereby, the delivery flow rate of the open-circuit pump 3 decreases.

Figure 6:
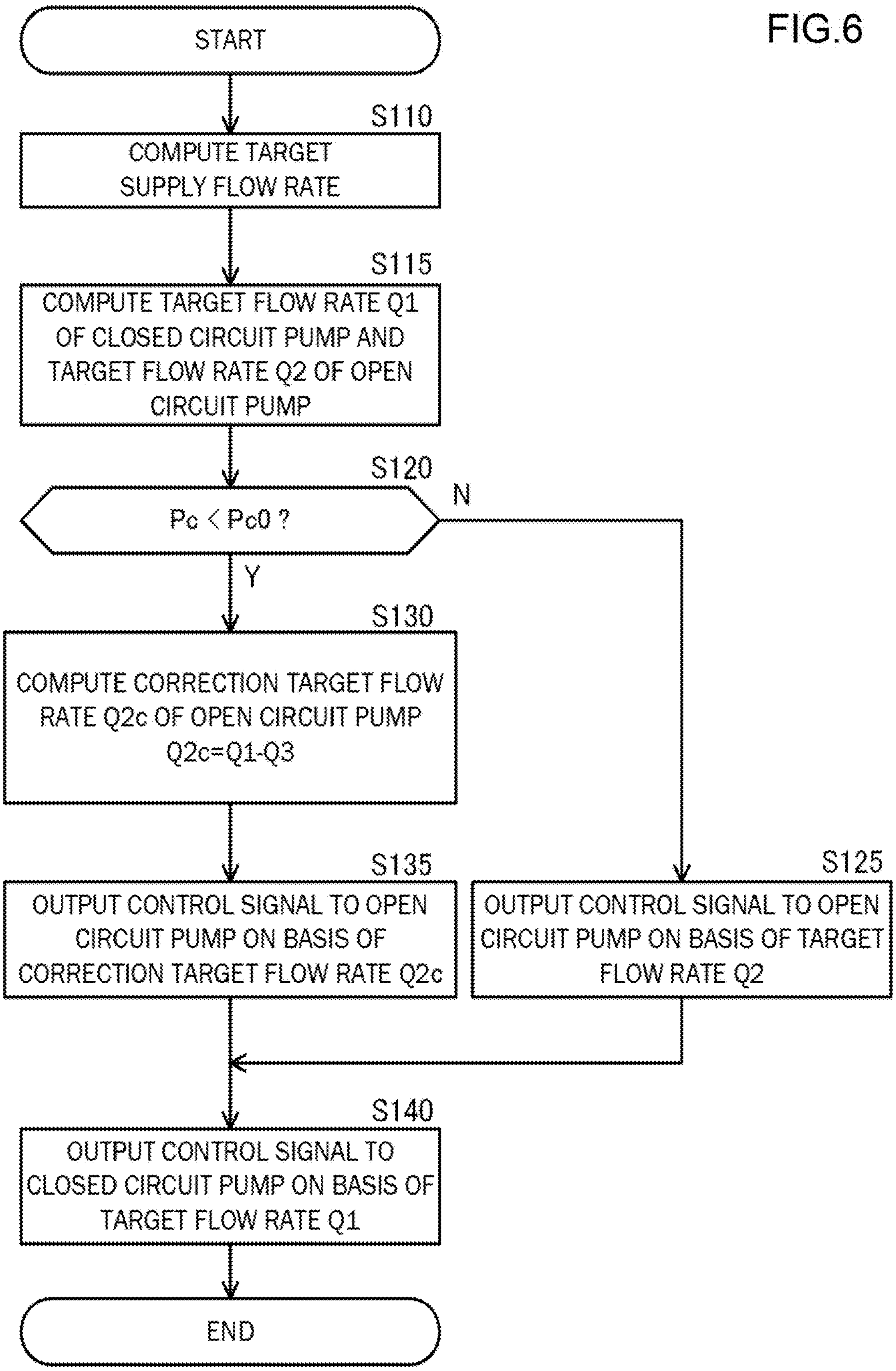
FIG. 6 is a flowchart depicting an example of flow control executed by the controller according to the first embodiment.

With reference to FIG. 6, an example of flow control executed by the controller 7 is explained. A process depicted in a flowchart in FIG. 6 is started by an ignition switch, which is not depicted, being turned on, and is repeatedly executed at predetermined control intervals after initial setting, which is not depicted, is performed.

As depicted in FIG. 6, at Step S110, the target supply flow rate computing section 101 computes, on the basis of the operation amount sensed by the operation amount sensor 8*a*, a target supply flow rate of the hydraulic working fluid to be supplied to the arm cylinder 26, and also identifies the operation direction of the operation lever 8*b*, and then the process proceeds to Step S115.

At Step S115, the target delivery flow rate computing section 102 computes, on the basis of the target supply flow rate computed at Step S110, the target flow rate Q1 of the closed-circuit pump 1 and the target flow rate Q2 of the open-circuit pump 3, and the process proceeds to Step S120.

At Step S120, the determining section 104 determines whether or not the charge pressure Pc sensed by the pressure sensor 10 is lower than the pressure threshold Pc0. When it is determined at Step S120 that the charge pressure Pc is equal to or higher than the pressure threshold Pc0, the process proceeds to Step S125, and when it is determined at Step S120 that the charge pressure Pc is lower than the pressure threshold Pc0, the process proceeds to Step S130.

At Step S125, the pump control section 106 outputs, to the second regulator 4 of the open-circuit pump 3, a control signal corresponding to the target flow rate Q2 computed at Step S115.

In addition, although not depicted, at Step S125, the valve control section 103 outputs, to the first selector valve 15*a* and the second selector valve 15*b*, control signals corresponding to the operation direction identified at Step S110. When the process of Step S125 ends, the controller 7 proceeds to Step S140.

At Step S130, the correcting section 105 computes, as the correction target flow rate Q2c of the open-circuit pump 3, a value obtained by subtracting the delivery flow rate Q3 of the charge pump 9 stored on the non-volatile memory 72 from the target flow rate Q1 of the closed-circuit pump 1 computed at Step S115, and the process proceeds to Step S135.

At Step S135, the pump control section 106 outputs, to the second regulator 4 of the open-circuit pump 3, a control signal corresponding to the correction target flow rate Q2c computed at Step S130.

In addition, although not depicted, at Step S135, the valve control section 103 outputs, to the first selector valve 15*a* and the second selector valve 15*b*, control signals corresponding to the operation direction identified at Step S110. When the process of Step S135 ends, the controller 7 proceeds to Step S140.

At Step S140, the pump control section 106 outputs, to the first regulator 2 of the closed-circuit pump 1, a control signal corresponding to the target flow rate Q1 computed at Step S115, and the process for the current control period depicted in the flowchart in FIG. 6 is ended. That is, when the process of Step S140 ends, the process of Step S110 is executed for the next control period.

An example of an action of the hydraulic excavator 100 according to the present embodiment is explained. Note that, for convenience of explanation, specific numerical values are described in the explanation, but these numerical values are merely examples. It is assumed that the delivery flow rate of the charge pump 9 is 30 [L/min], the pressure-receiving area ratio between the bottom-side fluid chamber 26*a* and rod-side fluid chamber 26*b* of the arm cylinder 26 is 1:0.7, and the set pressure of the charge relief valve 65 is 2.0 [MPa].

When an operator operates the operation device 8 of the arm 23 toward an arm crowding side for excavation with the hydraulic excavator 100, the controller 7 computes a target supply flow rate.

The controller 7 computes the target flow rate Q1 of the closed-circuit pump 1 and the target flow rate Q2 of the open-circuit pump 3 on the basis of the target supply flow rate. The controller 7 outputs control signals corresponding to a result of the computation to the first regulator 2 and the second regulator 4.

In addition, the controller 7 outputs an ON signal to the first selector valve 15*a*, and switches the first selector valve 15*a* to the open position. Note that the controller 7 outputs an OFF signal to the second selector valve 15*b*, and makes the second selector valve 15*b* stay at the closed position.

Here, a case will be explained as an example, where it is assumed that the target supply flow rate is 100 [L/min], the target flow rate Q1 of the closed-circuit pump 1 is 80 [L/min], and the target flow rate Q2 of the open-circuit pump 3 is 20 [L/min]. Where the charge pressure Pc sensed by the pressure sensor 10 is equal to or higher than the pressure threshold Pc0, the controller 7 controls the first regulator 2 and the second regulator 4 such that the delivery flow rate of the closed-circuit pump 1 becomes 80 [L/min] and the delivery flow rate of the open-circuit pump 3 becomes 20 [L/min].

Where the flow rate of the hydraulic working fluid supplied to the bottom-side fluid chamber 26*a* of the arm cylinder 26 is 100 [L/min], the flow rate of the hydraulic working fluid discharged from the rod-side fluid chamber 26*b* is 70 [L/min] according to the pressure-receiving area difference between the bottom-side fluid chamber 26*a* and the rod-side fluid chamber 26*b*. Note that the flow rate of the hydraulic working fluid supplied from the closed circuit Cc to the charge flow path 11 through the flushing valve 16 is 0 [L/min].

The required flow rate of the hydraulic working fluid to return to the closed-circuit pump 1 is 80 [L/min], which is the same as the delivery flow rate. Because of this, 10 [L/min] of the hydraulic working fluid in the hydraulic working fluid delivered from the charge pump 9 is added to the second flow path 62 from the charge flow path 11 through the second makeup valve 66*b*. Note that the remaining 20 [L/min] of the hydraulic working fluid, which is not added to the second flow path 62, in the hydraulic working fluid delivered from the charge pump 9 is discharged from the charge relief valve 65 to the tank 17.

The hydraulic working fluid is supplied to the bottom-side fluid chamber 26*a* of the arm cylinder 26, and the hydraulic working fluid is discharged from the rod-side fluid chamber 26*b* of the arm cylinder 26 to extend the arm cylinder 26. Note that the extension speed of the arm cylinder 26 is determined according to the flow rate of the hydraulic working fluid supplied to the bottom-side fluid chamber 26*a* and the pressure-receiving area of the bottom-side fluid chamber 26*a*. Due to the extension of the arm cylinder 26, the arm 23 performs an action toward the arm crowding side, and the bucket 22 excavates earth and sand.

When the bucket 22 contacts a hard soil during the excavation, a crowding action of the arm 23 is restricted. For example, the crowding action of the arm 23 is decelerated or stopped. When the extending action of the arm cylinder 26 is restricted, the flow rate of the hydraulic working fluid discharged from the rod-side fluid chamber 26*b* to the second flow path 62 decreases.

For example, where the crowding action of the arm 23 is stopped, the flow rate of the hydraulic working fluid discharged from the rod-side fluid chamber 26*b* to the second flow path 62 becomes 0 [L/min]. The delivery flow rate of the charge pump 9 is 30 [L/min]. Note that, in the present embodiment, the hydraulic working fluid delivered from the open-circuit pump 3 to the first flow path 61 is introduced to the charge flow path 11 through the flushing valve 16.

However, if the delivery flow rate of the open-circuit pump 3 stays at 20 [L/min], the flow rate of the return fluid to return to the closed-circuit pump 1 is 50 [L/min], which is the total of the delivery flow rate 30 [L/min] of the charge pump 9 and the delivery flow rate 20 [L/min] of the open-circuit pump 3, and falls short of 80 [L/min], which is the required flow rate of the return fluid to return to the closed-circuit pump 1.

If the return fluid to return to the closed-circuit pump 1 becomes insufficient, there is a fear that cavitation occurs because the pressure on the return side of the closed-circuit pump 1 temporarily becomes a negative pressure, to deteriorate the closed-circuit pump 1. In addition, if the return fluid to return to the closed-circuit pump 1 becomes insufficient, there is a fear that a flow rate required for lubricating movable sections such as gears or bearings of the closed-circuit pump 1 cannot be temporarily ensured. As a result, there is a fear that galling occurs at the movable sections to deteriorate the movable sections.

If the pressures of the charge flow path 11 and the second flow path 62 lower due to the insufficiency of the return fluid to return to the closed-circuit pump 1, the pressure difference between the bottom-side fluid chamber 26*a* and the rod-side fluid chamber 26*b* of the arm cylinder 26 increases. As a result, the cylinder thrust of the arm cylinder 26 increases, and the operational feeling changes undesirably.

Furthermore, if the cylinder thrust increases, the load acting on a portion where driven members of the work device 20 are coupled with each other also increases. Because of this, there is a fear that the stress generated at a welded portion or the like of the portion, where the driven members of the work device 20 are coupled with each other, increases to decrease the lifetime of the coupling portion.

In view of this, in order to prevent the occurrence of these problems, the controller 7 according to the present embodiment compensates for a shortfall in the return fluid to return to the closed-circuit pump 1 by increasing the delivery flow rate of the open-circuit pump 3. Specifically, when the charge pressure Pc has lowered to be lower than the pressure threshold Pc0 from equal to or higher than the pressure threshold Pc0 due to restriction of an action of the arm cylinder 26, the controller 7 increases the delivery flow rate of the open-circuit pump 3.

In a state where an action of the arm cylinder 26 is forcibly stopped due to contact of the bucket 22 with a hard soil, the flushing valve 16 is switched to the first direction D1 due to the difference between the pressure of the bottom-side fluid chamber 26*a* and the pressure of the rod-side fluid chamber 26*b*. Thereby, the flushing valve 16 establishes communication between the first flow path 61 and the charge flow path 11. Accordingly, the hydraulic working fluid delivered from the open-circuit pump 3 is introduced as an excess fluid to the charge flow path 11 through the flushing valve 16.

The flow rate of the hydraulic working fluid introduced from the charge flow path 11 to the second flow path 62 through the second makeup valve 66*b* is 50 [L/min], which is obtained by adding together the delivery flow rate 30 [L/min] of the charge pump 9 and the delivery flow rate 20 [L/min] of the open-circuit pump 3. Accordingly, a shortfall in the return fluid to return to the closed-circuit pump 1 is 30 [L/min] (=80 [L/min]−50 [L/min]). The controller 7 increases the delivery flow rate of the open-circuit pump 3 by 30 [L/min], which is the shortfall, in order to make the delivery-side flow rate and suction-side flow rate of the closed-circuit pump 1 the same.

Specifically, the controller 7 computes the correction target flow rate Q2c=50 [L/min], which is a value obtained by subtracting the delivery flow rate Q3=30 [L/min] of the charge pump 9 from the target flow rate Q1=80 [L/min] of the closed-circuit pump 1. The correction target flow rate Q2c is equivalent to the value 50 [L/min] (=Q2c), which is obtained by adding the shortfall 30 [L/min] (=Q1−(Q2+Q3)) in the flow rate of the hydraulic working fluid to the target flow rate 20 [L/min] (=Q2) of the open-circuit pump 3.

The controller 7 controls the second regulator 4 such that the delivery flow rate of the open-circuit pump 3 becomes the correction target flow rate Q2c=50 [L/min]. That is, the controller 7 increases the delivery flow rate of the open-circuit pump 3 by the shortfall in the flow rate of the hydraulic working fluid.

Thereby, the flow rate of the hydraulic working fluid introduced from the charge flow path 11 to the second flow path 62 through the second makeup valve 66*b* becomes 80 [L/min], which is obtained by adding together the delivery flow rate 30 [L/min] of the charge pump 9 and the delivery flow rate 50 [L/min] of the open-circuit pump 3. As a result, the required flow rate of the return fluid of the closed-circuit pump 1 is ensured. Note that, due to the increase in the delivery flow rate of the open-circuit pump 3, the pressure of the charge flow path 11 returns to the set pressure.

The embodiment described above achieves the following actions and effects.

(1) The hydraulic excavator (work machine) 100 includes: the articulated work device 20 that has the arm cylinder (hydraulic actuator) 26 and performs the excavation work; the closed-circuit pump 1 that is connected to the arm cylinder 26 in the closed circuit Cc, and supplies and discharges the hydraulic working fluid to and from the arm cylinder 26; the open-circuit pump 3 that is connected to the arm cylinder 26 in the open circuit Oc, and supplies the hydraulic working fluid to the arm cylinder 26; the charge pump 9; the charge flow path 11 that introduces the hydraulic working fluid delivered from the charge pump 9 to the closed circuit Cc; the pressure sensor 10 that senses the charge pressure Pc, which is the pressure of the charge flow path 11; the flushing valve (excess fluid discharging device) 16 that discharges an excess hydraulic working fluid of the closed circuit Cc to the charge flow path 11; and the controller 7 that controls the delivery capacities of the closed-circuit pump 1 and the open-circuit pump 3.

The controller 7 determines whether or not the charge pressure Pc sensed by the pressure sensor 10 is lower than the pressure threshold Pc0 (Step S120 in FIG. 6). The controller 7 repeatedly performs the determination process described above (Step S120) at predetermined control intervals, and, when the result of the determination changes from NO to YES, senses that the charge pressure Pc has lowered to be lower than the pressure threshold Pc0 from equal to or higher than the pressure threshold Pc0. Where the charge pressure Pc sensed by the pressure sensor 10 has lowered to be lower than the pressure threshold Pc0 from equal to or higher than the pressure threshold Pc0, the controller 7 increases the delivery capacity of the open-circuit pump 3 (Steps S130 and S135 in FIG. 6). That is, when the state of the charge pressure Pc has transited to be lower than the pressure threshold Pc0 from equal to or higher than the predetermined pressure threshold Pc0, the controller 7 increases the delivery capacity of the open-circuit pump 3. Thereby, the flow rate of the hydraulic working fluid delivered from the open-circuit pump 3 increases.

In this configuration, the delivery flow rate of the open-circuit pump 3 is increased when an action of the arm cylinder 26 is restricted for such a reason that the bucket 22 contacts a hard soil during excavation, enabling prevention of the return fluid of the closed-circuit pump 1 from being insufficient. As a result, it is possible to prevent the occurrence of cavitation or galling caused by the insufficiency of the return fluid of the closed-circuit pump 1.

Accordingly, the present embodiment can provide the hydraulic excavator (work machine) 100 that can inhibit the deterioration of the closed-circuit pump 1 caused by cavitation or galling.

(2) In addition, the present embodiment can prevent changes in the cylinder thrust of the arm cylinder 26 caused by the insufficiency of the return fluid of the closed-circuit pump 1. As a result, it is possible to prevent changes in an operational feeling.

(3) Furthermore, the present embodiment can inhibit the increase in the load acting on a portion, where driven members of the work device 20 are coupled with each other, or the like by preventing the increase in the cylinder thrust of the arm cylinder 26 caused by the insufficiency of the return fluid of the closed-circuit pump 1. As a result, it is possible to inhibit the decrease in the lifetime of the work device 20.

(4) The controller 7 increases the delivery capacity of the open-circuit pump 3 while maintaining the delivery flow rate of the closed-circuit pump 1 when the charge pressure Pc sensed by the pressure sensor 10 has lowered to be lower than the pressure threshold from equal to or higher than the pressure threshold Pc0. This configuration can drive the arm cylinder 26 at an action speed requested by an operator immediately after a hard soil is excavated.

(5) The controller 7 computes, as the target value (correction target flow rate) Q2c of the delivery flow rate of the open-circuit pump 3, a value obtained by subtracting the delivery flow rate Q3 of the charge pump 9 from the target value (target flow rate) Q1 of the delivery flow rate of the closed-circuit pump 1 when the charge pressure Pc sensed by the pressure sensor 10 has lowered to be lower than the pressure threshold Pc0 from equal to or higher than the pressure threshold Pc0 (Step S130 in FIG. 6). The controller 7 controls the delivery capacity of the open-circuit pump 3 on the basis of the target value (correction target flow rate) Q2c of the computed delivery flow rate of the open-circuit pump 3 (Step S135 in FIG. 6). Thus, since a required flow rate of the return fluid to return to the closed-circuit pump 1 can be appropriately ensured, it is possible to inhibit the deterioration of the closed-circuit pump 1 effectively.

(6) Meanwhile, a leak of the hydraulic working fluid occurs in the charge circuit 63 due to aging, in some cases. In this case, there is a fear that the flow rate of the hydraulic working fluid added from the charge flow path 11 to the closed circuit Cc becomes insufficient since the pressure of the charge flow path 11 lowers. In the present embodiment, it is possible to add the hydraulic working fluid to the return fluid to return to the closed circuit Cc by increasing the delivery flow rate of the open-circuit pump 3 when the pressure of the charge flow path 11 has lowered.

Accordingly, the present embodiment can appropriately add the hydraulic working fluid to the return fluid to return to the closed circuit Cc even when a leak of the hydraulic working fluid of the charge circuit 63 has occurred due to aging. As a result, similarly to (1) described above, it is possible to inhibit the deterioration of the closed-circuit pump 1 caused by cavitation or galling. In addition, similarly to (2) described above, it is possible to prevent changes in the operational feeling. Furthermore, similarly to (3) described above, it is possible to inhibit the decrease in the lifetime of the work device 20.

Second Embodiment

The hydraulic excavator 100 according to a second embodiment of the present invention is explained with reference to FIG. 7. Note that constituent elements identical or equivalent to constituent elements explained in the first embodiment are given identical reference numerals, and differences are explained mainly.

In the first embodiment, the controller 7 increases the delivery capacity (tilting angle) of the open-circuit pump 3 while maintaining the delivery capacity (tilting angle) of the closed-circuit pump 1 when the charge pressure Pc has lowered to be lower than the pressure threshold Pc0 from equal to or higher than the pressure threshold Pc0.

In contrast, in the second embodiment, the controller 7 increases the delivery capacity (tilting angle) of the open-circuit pump 3, and reduces the delivery capacity (tilting angle) of the closed-circuit pump 1 when the charge pressure Pc has lowered to be lower than the pressure threshold Pc0 from equal to or higher than the pressure threshold Pc0. Hereinbelow, the content of control by the controller 7 according to the second embodiment is explained in detail.

Figure 7:
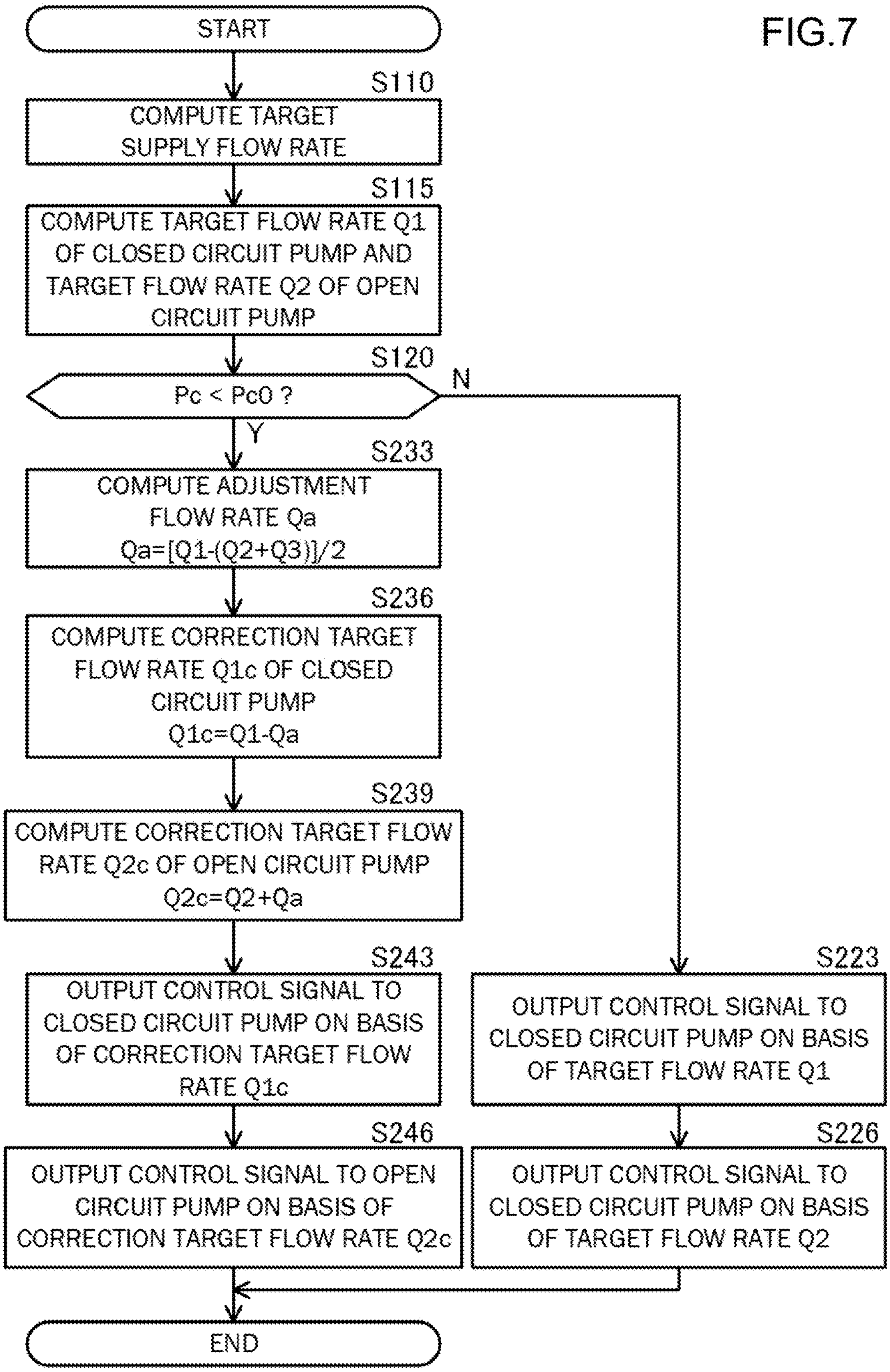
FIG. 7 is a flowchart depicting an example of flow control executed by the controller according to a second embodiment.

FIG. 7 is a figure similar to FIG. 6, and is a flowchart depicting an example of flow control executed by the controller 7 according to the second embodiment. In the flowchart in FIG. 7, processes of Steps S223 to S246 are executed instead of the processes of Steps S125 to S140 in the flowchart in FIG. 6.

As depicted in FIG. 7, at Step S120, the determining section 104 determines whether or not the charge pressure Pc sensed by the pressure sensor 10 is lower than the pressure threshold Pc0. When it is determined at Step S120 that the charge pressure Pc is equal to or higher than the pressure threshold Pc0, the process proceeds to Step S223, and when it is determined at Step S120 that the charge pressure Pc is lower than the pressure threshold Pc0, the process proceeds to Step S233.

At Step S223, the pump control section 106 outputs, to the first regulator 2 of the closed-circuit pump 1, a control signal corresponding to the target flow rate Q1 computed at Step S115, and the process proceeds to Step S226.

At Step S226, the pump control section 106 outputs, to the second regulator 4 of the open-circuit pump 3, a control signal corresponding to the target flow rate Q2 computed at Step S115.

In addition, although not depicted, at Step S226, the valve control section 103 outputs, to the first selector valve 15*a* and the second selector valve 15*b*, control signals corresponding to the operation direction identified at Step S110.

When the process of Step S226 is ended, the controller 7 ends the process depicted in the flowchart in FIG. 7 in the current control period.

At Step S233, the correcting section 105 computes an adjustment flow rate Qa on the basis of the target flow rate Q1 and the target flow rate Q2 that are computed at Step S115 and the delivery flow rate Q3 of the charge pump 9. The adjustment flow rate Qa is computed in accordance with the following Formula (2).

$$Qa = [Q1 - (Q2 + Q3)]/2 \qquad (2)$$

After the adjustment flow rate Qa is computed, the process proceeds to Step S236.

At Step S236, the correcting section 105 computes a correction target flow rate Q1c on the basis of the target flow rate Q1 computed at Step S115 and the adjustment flow rate Qa computed at Step S233. The correction target flow rate Q1c is computed in accordance with the following Formula (3).

$$Q1c = Q1 - Qa \qquad (3)$$

After the correction target flow rate Q1c is computed, the process proceeds to Step S239.

At Step S239, the correcting section 105 computes the correction target flow rate Q2c on the basis of the target flow rate Q2 computed at Step S115 and the adjustment flow rate Qa computed at Step S233. The correction target flow rate Q2c is computed in accordance with the following Formula (4).

$$Q2c = Q2 + Qa \qquad (4)$$

After the correction target flow rate Q2c is computed, the process proceeds to Step S243.

At Step S243, the pump control section 106 outputs, to the first regulator 2 of the closed-circuit pump 1, a control signal corresponding to the correction target flow rate Q1c computed at Step S236, and the process proceeds to Step S246.

At Step S246, the pump control section 106 outputs, to the second regulator 4 of the open-circuit pump 3, a control signal corresponding to the correction target flow rate Q2c computed at Step S236.

In addition, although not depicted, at Step S246, the valve control section 103 outputs, to the first selector valve 15*a* and the second selector valve 15*b*, control signals corresponding to the operation direction identified at Step S110.

The controller 7 ends, when the process of Step S246 is ended, the process depicted in the flowchart in FIG. 7 in the current control period.

An example of an action of the hydraulic excavator 100 according to the present embodiment is explained. Note that, for convenience of explanation, specific numerical values are described in the explanation, but these numerical values are merely examples. Similarly to the first embodiment, it is assumed that the delivery flow rate of the charge pump 9 is 30 [L/min], the pressure-receiving area ratio between the bottom-side fluid chamber 26*a* and rod-side fluid chamber 26*b* of the arm cylinder 26 is 1:0.7, and the set pressure of the charge relief valve 65 is 2.0 [MPa]. In addition, similarly to the first embodiment, in the action to be explained, the bucket 22 has contacted a hard soil when the target supply flow rate is computed as being 100 [L/min], the target flow rate Q1 is computed as being 80 [L/min], and the target flow rate Q2 is computed as being 20 [L/min] during excavation.

The controller 7 according to the first embodiment increases the delivery capacity of the open-circuit pump 3 in a state where the delivery capacity of the closed-circuit pump 1 is maintained when the charge pressure Pc has lowered to be lower than the pressure threshold Pc0 from the pressure threshold Pc0. In contrast, the controller 7 according to the second embodiment increases the delivery capacity of the open-circuit pump 3, and reduces the delivery capacity of the closed-circuit pump 1 when the charge pressure Pc has lowered to be lower than the pressure threshold Pc0 from equal to or higher than the pressure threshold Pc0.

In a state where an action of the arm cylinder 26 is forcibly stopped due to contact of the bucket 22 with a hard soil, the flushing valve 16 is switched to the first direction D1 due to the difference between the pressure of the bottom-side fluid chamber 26*a* and the pressure of the rod-side fluid chamber 26*b*. Thereby, the flushing valve 16 establishes communication between the first flow path 61 and the charge flow path 11. Accordingly, the hydraulic working fluid delivered from the open-circuit pump 3 is introduced as an excess fluid to the charge flow path 11 through the flushing valve 16.

The flow rate of the hydraulic working fluid introduced from the charge flow path 11 to the second flow path 62 through the second makeup valve 66*b* is 50 [L/min], which is obtained by adding together the delivery flow rate 30 [L/min] of the charge pump 9 and the delivery flow rate 20 [L/min] of the open-circuit pump 3. Accordingly, a shortfall in the return fluid to return to the closed-circuit pump 1 is 30 [L/min] (=80 [L/min]−50 [L/min]). In order to make the delivery amount and suction amount of the closed-circuit pump 1 the same, the controller 7 increases the delivery flow rate of the open-circuit pump 3 by 15 [L/min] (=30 [L/min]/2), and reduces the delivery flow rate of the closed-circuit pump 1 by 15 [L/min] (=30 [L/min]/2).

Specifically, the controller 7 computes, as the adjustment flow rate Qa, half of the shortfall 30 [L/min] in the flow rate of the hydraulic working fluid. The controller 7 computes the correction target flow rate Q2c=35 [L/min], which is a value obtained by adding the adjustment flow rate Qa=15 [L/min] to the target flow rate Q2=20 [L/min] of the open-circuit pump 3. In addition, the controller 7 computes the correction target flow rate Q1c=65 [L/min], which is a value obtained by subtracting the adjustment flow rate Qa=15 [L/min] from the target flow rate Q1=80 [L/min] of the closed-circuit pump 1.

The controller 7 controls the first regulator 2 such that the delivery flow rate of the closed-circuit pump 1 becomes the correction target flow rate Q1c=65 [L/min]. The controller 7 controls the second regulator 4 such that the delivery flow rate of the open-circuit pump 3 becomes the correction target flow rate Q2c=35 [L/min].

Thereby, the flow rate of the hydraulic working fluid introduced from the charge flow path 11 to the second flow path 62 through the second makeup valve 66*b* becomes 65 [L/min], which is obtained by adding together the delivery flow rate 30 [L/min] of the charge pump 9 and the delivery flow rate 35 [L/min] of the open-circuit pump 3. Since the delivery flow rate of the closed-circuit pump 1 has decreased to 65 [L/min], the required flow rate of the return fluid of the closed-circuit pump 1 is ensured.

In this manner, the controller 7 according to the second embodiment increases the delivery capacity of the open-circuit pump 3, and reduces the delivery capacity of the closed-circuit pump 1 when the charge pressure Pc sensed by the pressure sensor 10 has lowered to be lower than the pressure threshold Pc0 from equal to or higher than the pressure threshold Pc0 (Steps S233, S236, S239, S243, and S246 in FIG. 7).

The second embodiment like this can achieve advantages similar to (1) to (3), and (6) explained with reference to the first embodiment. Furthermore, the present second embodiment can achieve the following advantage (7).

(7) The controller 7 increases the delivery capacity of the open-circuit pump 3, and reduces the delivery capacity of the closed-circuit pump 1 such that the total value of the delivery flow rate of the closed-circuit pump 1 and the delivery flow rate of the open-circuit pump 3 is maintained when the charge pressure Pc sensed by the pressure sensor 10 has lowered to be lower than the pressure threshold Pc0 from equal to or higher than the pressure threshold Pc0 (Steps S233, S236, S239, S243, and S246 in FIG. 7).

In the first embodiment, the total value (100 [L/min]) of the delivery flow rate (80 [L/min]) of the closed-circuit pump 1 and the delivery flow rate (20 [L/min]) of the open-circuit pump 3 before the determination described above is different from the total value (130 [L/min]) of the delivery flow rate (80 [L/min]) of the closed-circuit pump 1 and the delivery flow rate (50 [L/min]) of the open-circuit pump 3 after the determination described above. Because of this, there is a fear that a shock occurs in an action of the work device 20 after a hard soil is excavated in the first embodiment.

In contrast, according to the second embodiment, the total value (100 [L/min]) of the delivery flow rate (80 [L/min]) of the closed-circuit pump 1 and the delivery flow rate (20 [L/min]) of the open-circuit pump 3 before the determination described above becomes the same as the total value (100 [L/min]) of the delivery flow rate (65 [L/min]) of the closed-circuit pump 1 and the delivery flow rate (35 [L/min]) of the open-circuit pump 3 after the determination described above. Because of this, it is possible to prevent the occurrence of a shock in an action of the work device 20 after a hard soil is excavated.

Third Embodiment

The hydraulic excavator 100 according to a third embodiment of the present invention is explained with reference to FIG. 8. Note that constituent elements identical or equivalent to constituent elements explained in the first embodiment are given identical reference numerals, and differences are explained mainly.

In the first embodiment, the controller 7 increases the delivery capacity (tilting angle) of the open-circuit pump 3 while maintaining the delivery capacity (tilting angle) of the closed-circuit pump 1 when the charge pressure Pc has lowered to be lower than the pressure threshold Pc0 from equal to or higher than the pressure threshold Pc0.

In contrast, in the third embodiment, the controller 7 reduces the delivery capacity (tilting angle) of the closed-circuit pump 1 while maintaining the delivery capacity (tilting angle) of the open-circuit pump 3 when the charge pressure Pc has lowered to be lower than the pressure threshold Pc0 from equal to or higher than the pressure threshold Pc0. Hereinbelow, the content of control by the controller 7 according to the third embodiment is explained in detail.

Figure 8:
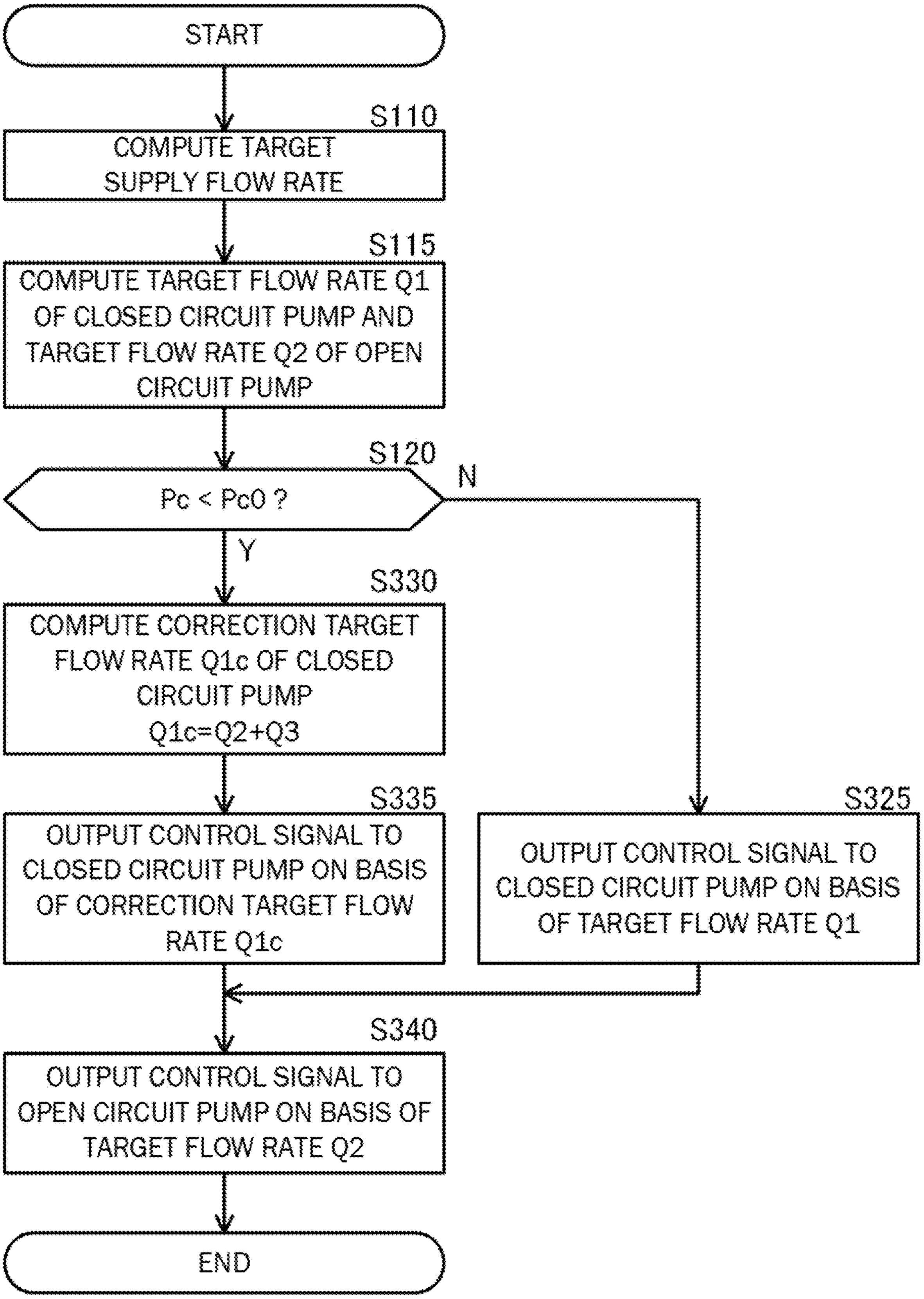
FIG. 8 is a flowchart depicting an example of flow control executed by the controller according to a third embodiment.

FIG. 8 is a figure similar to FIG. 6, and is a flowchart depicting an example of flow control executed by the controller 7 according to the third embodiment. In the flowchart in FIG. 8, processes of Steps S325 to S340 are executed instead of the processes of Steps S125 to S140 in the flowchart in FIG. 6.

As depicted in FIG. 8, at Step S120, the determining section 104 determines whether or not the charge pressure Pc sensed by the pressure sensor 10 is lower than the pressure threshold Pc0. When it is determined at Step S120 that the charge pressure Pc is equal to or higher than the pressure threshold Pc0, the process proceeds to Step S325, and when it is determined at Step S120 that the charge pressure Pc is lower than the pressure threshold Pc0, the process proceeds to Step S330.

At Step S325, the pump control section 106 outputs, to the first regulator 2 of the closed-circuit pump 1, a control signal corresponding to the target flow rate Q1 computed at Step S115, and the process proceeds to Step S340.

At Step S330, the correcting section 105 computes, as the correction target flow rate Q1c of the closed-circuit pump 1, a value obtained by adding the delivery flow rate Q3 of the charge pump 9 stored on the non-volatile memory 72 to the target flow rate Q2 of the open-circuit pump 3 computed at Step S115, and the process proceeds to Step S335.

At Step S335, the pump control section 106 outputs, to the first regulator 2 of the closed-circuit pump 1, a control signal corresponding to the correction target flow rate Q1c computed at Step S330, and the process proceeds to Step S340.

At Step S340, the pump control section 106 outputs, to the second regulator 4 of the open-circuit pump 3, a control signal corresponding to the target flow rate Q2 computed at Step S115.

In addition, although not depicted, at Step S340, the valve control section 103 outputs, to the first selector valve 15*a* and the second selector valve 15*b*, control signals corresponding to the operation direction identified at Step S110.

When the process of Step S340 is ended, the controller 7 ends the process depicted in the flowchart in FIG. 8 in the current control period.

An example of an action of the hydraulic excavator 100 according to the present embodiment is explained. Note that, for convenience of explanation, specific numerical values are described in the explanation, but these numerical values are merely examples. Similarly to the first embodiment, it is assumed that the delivery flow rate of the charge pump 9 is 30 [L/min], the pressure-receiving area ratio between the bottom-side fluid chamber 26*a* and rod-side fluid chamber 26*b* of the arm cylinder 26 is 1:0.7, and the set pressure of the charge relief valve 65 is 2.0 [MPa]. In addition, similarly to the first embodiment, in the action to be explained, the bucket 22 has contacted a hard soil when the target supply flow rate is computed as being 100 [L/min], the target flow rate Q1 is computed as being 80 [L/min], and the target flow rate Q2 is computed as being 20 [L/min] during excavation.

The controller 7 computes the correction target flow rate Q1c=50 [L/min], which is a value obtained by adding together the target flow rate Q2=20 [L/min] of the open-circuit pump 3 and the target flow rate Q3=30 [L/min] of the charge pump 9. The correction target flow rate Q1c is equivalent to the value 50 [L/min] (=Q1c), which is obtained by subtracting the shortfall 30 [L/min] (=Q1−(Q2+Q3)) in the flow rate of the hydraulic working fluid from the target flow rate 80 [L/min] (=Q1) of the closed-circuit pump 1.

The controller 7 controls the first regulator 2 such that the delivery flow rate of the closed-circuit pump 1 becomes the correction target flow rate Q1c=50 [L/min]. That is, the controller 7 reduces the delivery flow rate of the closed-circuit pump 1 by the shortfall in the flow rate of the hydraulic working fluid. Thereby, the flow rate of the return fluid of the closed-circuit pump 1, which is the total value of the delivery flow rate of the open-circuit pump 3 and the delivery flow rate of the charge pump 9, matches the delivery flow rate of the closed-circuit pump 1, and there will no longer be the insufficiency of the return fluid to return to the closed-circuit pump 1.

In this manner, the controller 7 according to the third embodiment reduces the delivery capacity of the closed-circuit pump 1 when the charge pressure Pc sensed by the pressure sensor 10 has lowered to be lower than the pressure threshold Pc0 from equal to or higher than the pressure threshold Pc0. In other words, the controller 7 reduces the delivery capacity of the closed-circuit pump 1 when the state of the charge pressure Pc has transited to be lower than the pressure threshold Pc0 from equal to or higher than the predetermined pressure threshold Pc0. Thereby, the flow rate of the hydraulic working fluid delivered from closed-circuit pump 1 decreases.

The third embodiment like this can achieve advantages similar to (1) to (3), and (6) explained with reference to the first embodiment. Furthermore, the present third embodiment can achieve the following advantage (8).

(8) The controller 7 computes, as the target value (correction target flow rate) Q1c of the delivery flow rate of the closed-circuit pump 1, a value obtained by adding the delivery flow rate Q3 of the charge pump 9 to the target value (target flow rate) Q2 of the delivery flow rate of the open-circuit pump 3 when the charge pressure Pc sensed by the pressure sensor 10 has lowered to be lower than the pressure threshold Pc0 from equal to or higher than the pressure threshold Pc0. The controller 7 controls the delivery capacity of the closed-circuit pump 1 on the basis of the computed target value (correction target flow rate) Q1c of the delivery flow rate of the closed-circuit pump 1. Thus, since a required flow rate of the return fluid to return to the closed-circuit pump 1 can be appropriately ensured, it is possible to inhibit the deterioration of the closed-circuit pump 1 effectively.

Fourth Embodiment

Figure 9:
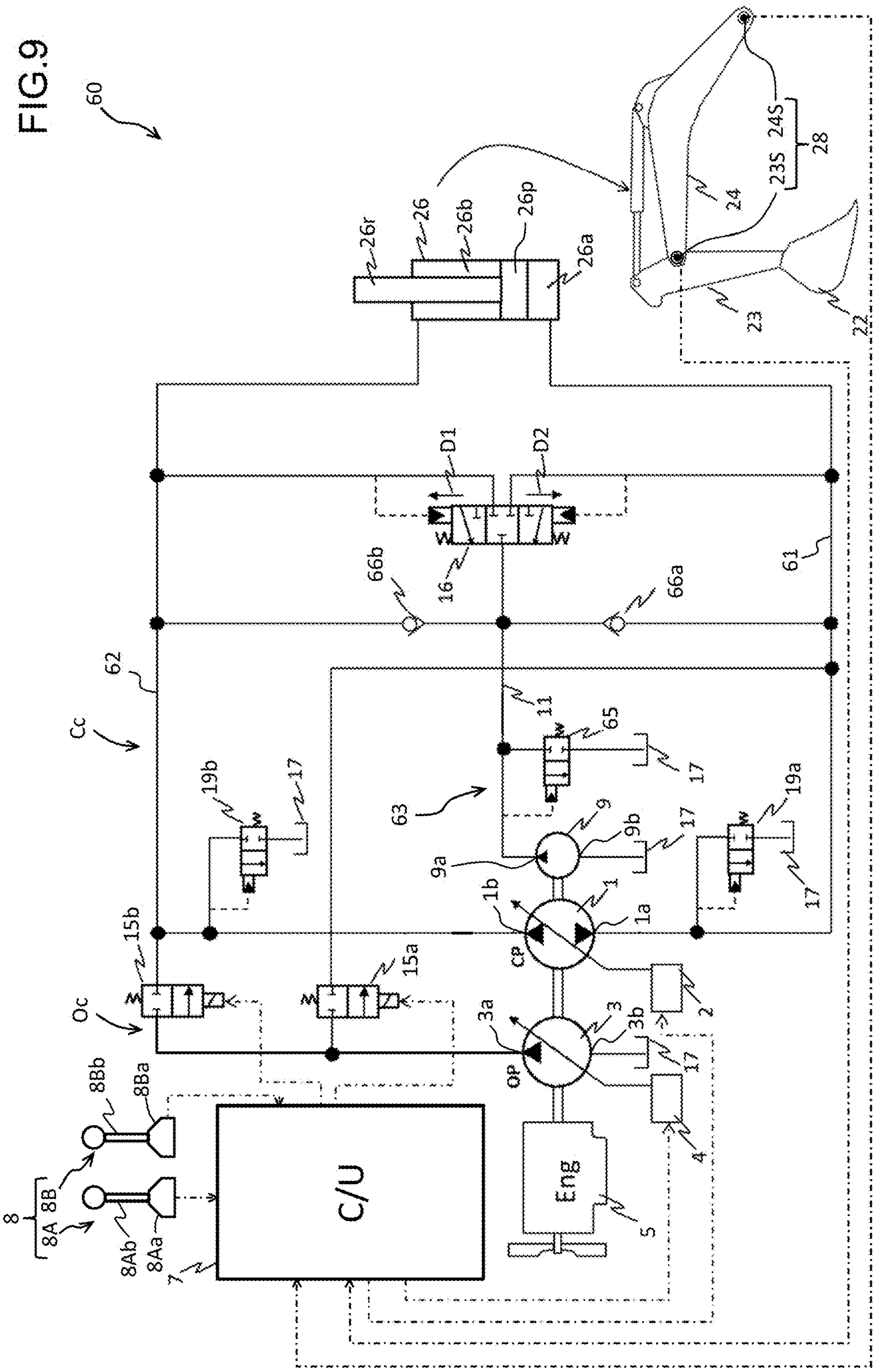
FIG. 9 is a figure depicting the hydraulic system mounted on the hydraulic excavator according to a fourth embodiment.

The hydraulic excavator 100 according to a fourth embodiment of the present invention is explained with reference to FIG. 9. As depicted in FIG. 9, the hydraulic system 60 includes: the closed-circuit pump 1 that is connected to the arm cylinder 26 in the closed circuit Cc, and supplies and discharges the hydraulic working fluid to and from the arm cylinder 26; the open-circuit pump 3 that is connected to the arm cylinder 26 in the open circuit Oc, and supplies the hydraulic working fluid to the arm cylinder 26;

and the controller 7 that controls the delivery capacities (displacement volumes) of the closed-circuit pump 1 and the open-circuit pump 3. Delivery capacity is a delivery amount of a pump per rotation. Note that the closed circuit Cc is a circuit in which a return fluid from the hydraulic actuator returns to the pump. In addition, the open circuit Oc is a circuit in which the return fluid from the hydraulic actuator does not return to the pump, and, for example, is a circuit configured such that the return fluid from the hydraulic actuator returns to a tank (not depicted).

In addition, the hydraulic system 60 includes: an arm operation device 8A that gives an instruction about an action of the arm cylinder 26; a boom operation device 8B that gives an instruction about an action of the boom cylinder 27; an arm angle sensor 23S that senses the pivot angle of the arm 23; and a boom angle sensor 24S that senses the pivot angle of the boom 24.

The arm operation device 8A has an inclinable arm operation lever 8Ab, and an arm operation amount sensor 8Aa that senses the operation amount (inclination angle) of the arm operation lever 8Ab. The boom operation device 8B has an inclinable boom operation lever 8Bb, and a boom operation amount sensor 8Ba that senses the operation amount (inclination angle) of the boom operation lever 8Bb.

The arm operation amount sensor 8Aa and the boom operation amount sensor 8Ba are electrically connected to the controller 7. The arm operation amount sensor 8Aa senses the operation amount of the arm operation lever 8Ab, and outputs a signal representing a result of the sensing to the controller 7. The boom operation amount sensor 8Ba senses the operation amount of the boom operation lever 8Bb, and outputs a signal representing a result of the sensing to the controller 7.

The arm operation device 8A for operating the arm 23, and the boom operation device 8B for operating the boom 24 are included in the operation device 8 for operating the work device 20.

The arm angle sensor 23S and the boom angle sensor 24S are electrically connected to the controller 7. The arm angle sensor 23S senses the pivot angle of the arm 23, and outputs a signal representing a result of the sensing to the controller 7. The boom angle sensor 24S senses the pivot angle of the boom 24, and outputs a signal representing a result of the sensing to the controller 7.

For example, the arm angle sensor 23S and the boom angle sensor 24S are potentiometers that acquire the pivot angles of the driven members, and output signals (voltages) corresponding to the acquired angles to the controller 7. Note that the arm angle sensor 23S and the boom angle sensor 24S may be ground angle sensors. In addition, a posture sensor included in a posture sensor 28 may be an IMU (Inertial Measurement Unit: inertial measurement unit).

The arm angle sensor 23S is a posture sensor that senses a posture of the arm 23, and the boom angle sensor 24S is a posture sensor that senses a posture of the boom 24. That is, the arm angle sensor 23S and the boom angle sensor 24S are included in the posture sensor 28 that senses a posture of the work device 20.

Furthermore, the hydraulic system 60 includes the first selector valve 15*a*, the second selector valve 15*b*, the first relief valve 19*a*, the second relief valve 19*b*, the flushing valve 16, the charge circuit 63, the tank 17, and the engine 5.

The closed-circuit pump 1 and the open-circuit pump 3 are rotation-driven by the engine 5, and deliver the hydraulic working fluid. The engine 5 is a motive power source of the hydraulic excavator 100, and, for example, includes an internal combustion engine such as a diesel engine. The hydraulic working fluid is stored in the tank 17.

The closed-circuit pump 1 is a variable displacement that can be varied. For example, the closed-circuit pump 1 is a swash plate type hydraulic pump or a bent axis type hydraulic pump.

The delivery capacity of the closed-circuit pump 1 is controlled by the closed-circuit pump regulator (hereinafter, written as a first regulator) 2. The first regulator 2 controls the delivery capacity of the closed-circuit pump 1 by controlling the tilting angle of the swash plate or the bent axis of the closed-circuit pump 1 on the basis of a control signal from the controller 7. The delivery flow rate of the closed-circuit pump 1 is determined according to the delivery capacity of the closed-circuit pump 1 and the rotation speed of the engine 5.

The closed-circuit pump 1 is a bidirectionally-tiltable hydraulic pump that can deliver the hydraulic working fluid in two directions. The closed-circuit pump 1 has the first pump port 1*a* and the second pump port 1*b*. The closed-circuit pump 1 can switch to the first delivery state and the second delivery state. In the first delivery state, the closed-circuit pump 1 sucks in the hydraulic working fluid from the second pump port 1*b*, and delivers the hydraulic working fluid from the first pump port 1*a*. In the second delivery state, the closed-circuit pump 1 sucks in the hydraulic working fluid from the first pump port 1*a*, and delivers the hydraulic working fluid from the second pump port 1*b*.

The first pump port 1*a* of the closed-circuit pump 1 and the bottom-side fluid chamber 26*a* of the arm cylinder 26 are connected by the first flow path 61. The second pump port 1*b* of the closed-circuit pump 1 and the rod-side fluid chamber 26*b* of the arm cylinder 26 are connected by the second flow path 62. In the present embodiment, the closed circuit Cc is formed by connecting the closed-circuit pump 1 and the arm cylinder 26 using the first flow path 61 and the second flow path 62.

The open-circuit pump 3 is a variable displacement hydraulic pump having delivery capacity (displacement volume) that can be varied. For example, the open-circuit pump 3 is the swash plate type hydraulic pump or the bent axis type hydraulic pump.

The delivery capacity of the open-circuit pump 3 is controlled by the open-circuit pump regulator (hereinafter, written as a second regulator) 4. The second regulator 4 controls the delivery capacity of the open-circuit pump 3 by controlling the tilting angle of the swash plate or the bent axis of the open-circuit pump 3 on the basis of a control signal from the controller 7. The delivery flow rate of the open-circuit pump 3 is determined according to the delivery capacity of the open-circuit pump 3 and the rotation speed of the engine 5.

The open-circuit pump 3 is a unidirectionally-tiltable hydraulic pump that can deliver the hydraulic working fluid in one direction. The open-circuit pump 3 has the pump port 3*a* and the suction port 3*b*. The open-circuit pump 3 sucks in the hydraulic working fluid in the tank 17 from the suction port 3*b*, and delivers the hydraulic working fluid from the pump port 3*a*.

The pump port 3*a* of the open-circuit pump 3 is connected to the first flow path 61 via the first selector valve 15*a*. In addition, the pump port 3*a* of the open-circuit pump 3 is connected to the second flow path 62 via the second selector valve 15*b*.

For example, the first selector valve 15*a* and the second selector valve 15*b* are two-port, two-position solenoid selector valves. The first selector valve 15*a* and the second selector valve 15*b* are switched to open positions or closed positions on the basis of control signals from the controller 7. When not supplied with currents, the first selector valve 15*a* and the second selector valve 15*b* are switched to the closed positions due to the urging forces of springs.

When the first selector valve 15*a* is switched to the open position, the first selector valve 15*a* establishes communication between the delivery flow path of the open-circuit pump 3 and the first flow path 61. When the first selector valve 15*a* is switched to the closed position, the first selector valve 15*a* interrupts the communication between the delivery flow path of the open-circuit pump 3 and the first flow path 61.

When the second selector valve 15*b* is switched to the open position, the second selector valve 15*b* establishes communication between the delivery flow path of the open-circuit pump 3 and the second flow path 62. When the second selector valve 15*b* is switched to the closed position, the second selector valve 15*b* interrupts the communication between the delivery flow path of the open-circuit pump 3 and the second flow path 62.

The first relief valve 19*a* is connected to the first flow path 61, and defines the maximum pressure of the first flow path 61. The second relief valve 19*b* is connected to the second flow path 62, and defines the maximum pressure of the second flow path 62.

The charge circuit 63 has: the charge pump 9; the charge flow path 11 that introduces the hydraulic working fluid delivered from the charge pump 9 to the closed circuit Cc through the first makeup valve 66*a* or the second makeup valve 66*b*; and the charge relief valve 65 that defines the maximum pressure of the charge flow path 11.

The charge pump 9 is a fixed displacement hydraulic pump having fixed delivery capacity. For example, the charge pump 9 is a gear pump. The charge pump 9 is driven by the engine 5, and sucks in and delivers the hydraulic working fluid in the tank 17.

For example, the set pressure of the charge relief valve 65 is set to approximately 2 MPa. The charge relief valve 65 discharges an excess amount of the hydraulic working fluid delivered from the charge pump 9 to the tank 17, and maintains the pressure of the charge flow path 11 at 2 MPa.

The pump port 9*a* of the charge pump 9 is connected to the charge flow path 11, and the suction port 9*b* of the charge pump 9 is connected to the tank 17.

The charge flow path 11 is connected to the first flow path 61 via the first makeup valve 66*a*. The first makeup valve 66*a* is a check valve that permits the hydraulic working fluid to flow from the charge flow path 11 to the first flow path 61, and prohibits the hydraulic working fluid from flowing from the first flow path 61 to the charge flow path 11.

In addition, the charge flow path 11 is connected to the second flow path 62 via the second makeup valve 66*b*. The second makeup valve 66*b* is a check valve that permits the hydraulic working fluid to flow from the charge flow path 11 to the second flow path 62, and prohibits the hydraulic working fluid from flowing from the second flow path 62 to the charge flow path 11.

The charge pump 9 sucks in the hydraulic working fluid from the tank 17, and delivers the hydraulic working fluid to the charge flow path 11. The hydraulic working fluid delivered from the charge pump 9 to the charge flow path 11 is added to the closed circuit Cc through the first makeup valve 66*a* or the second makeup valve 66*b*.

The flushing valve 16 is an excess fluid discharging device that is connected to the first flow path 61, the second flow path 62, and the charge flow path 11, and discharges an excess hydraulic working fluid (hereinafter, written also as excess fluid) in the closed circuit Cc to the charge flow path 11.

The flushing valve 16 establishes communication between the charge flow path 11 and a flow path with higher pressure between the first flow path 61 and the second flow path 62. Where the pressure of the first flow path 61 is higher than the pressure of the second flow path 62, the flushing valve 16 moves in the first direction D1, and the flushing valve 16 establishes communication between the first flow path 61 and the charge flow path 11. Where the pressure of the second flow path 62 is higher than the pressure of the first flow path 61, the flushing valve 16 moves in the second direction D2, and the flushing valve 16 establishes communication between the second flow path 62 and the charge flow path 11.

The controller 7 is electrically connected with the first regulator 2, the second regulator 4, the first selector valve 15*a*, and the second selector valve 15*b*. On the basis of signals from the operation device 8 and the posture sensor 28, the controller 7 outputs control signals to the first regulator 2 and the second regulator 4, and to the first selector valve 15*a* and the second selector valve 15*b*.

Figure 10:
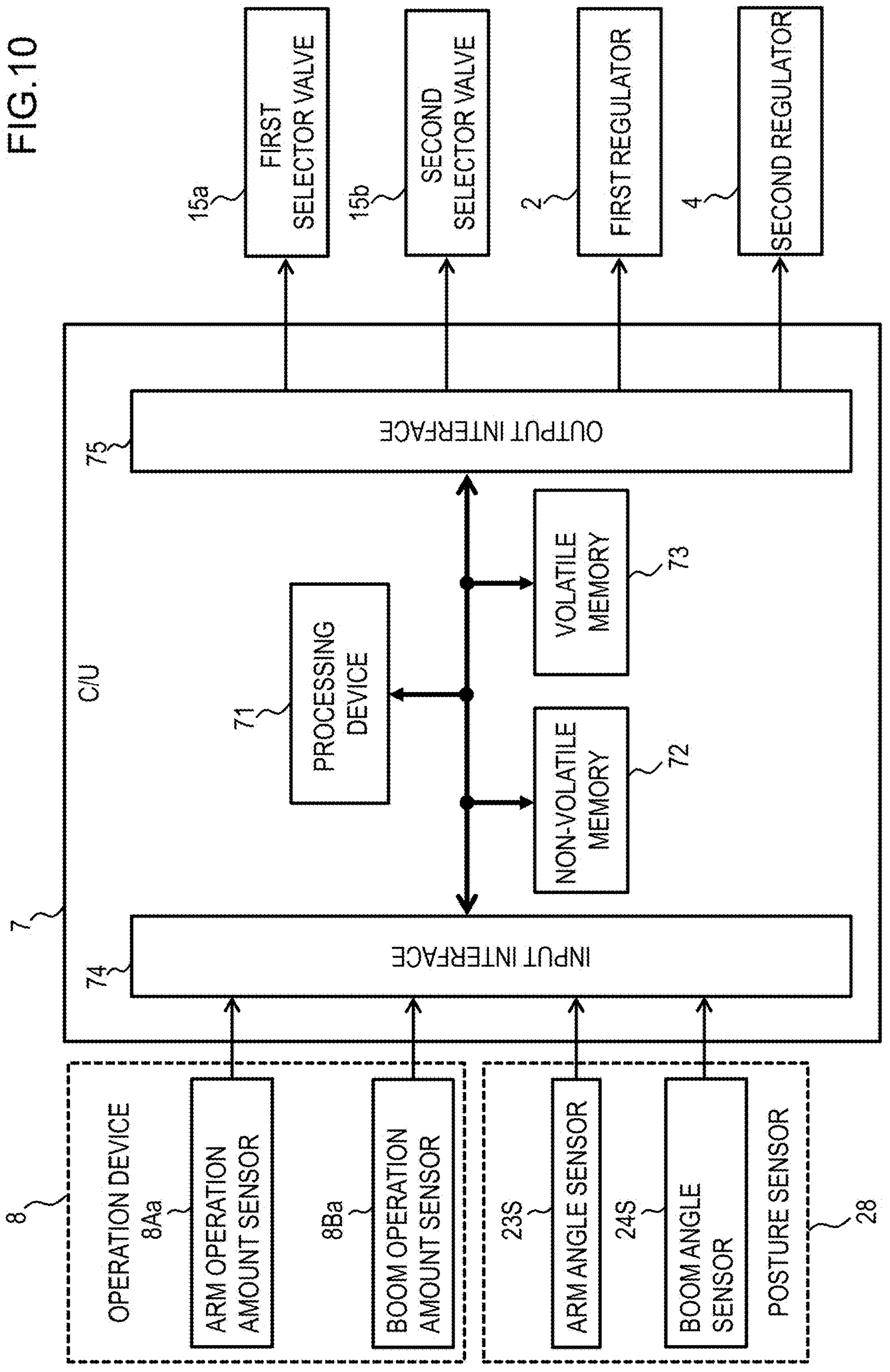
FIG. 10 is a hardware configuration diagram of the controller according to the fourth embodiment.

FIG. 10 is a hardware configuration diagram of the controller 7. As depicted in FIG. 10, the controller 7 is configured by using a computer including: the processing device 71 such as a CPU (Central Processing Unit), an MPU (Micro Processing Unit), or a DSP (Digital Signal Processor); the non-volatile memory 72 such as a ROM (Read Only Memory), a flash memory, or a hard disk drive; the volatile memory 73 which is commonly called a RAM (Random Access Memory); the input interface 74; the output interface 75; and other peripheral circuits. Note that the controller 7 may be configured by using one computer, or may be configured by using a plurality of computers. In addition, as the processing device 71, an ASIC (application specific integrated circuit), an FPGA (Field Programmable Gate Array), or the like can be used.

The non-volatile memory 72 has stored thereon programs that can execute various types of computation. That is, the non-volatile memory 72 is a storage medium from which programs to realize functions of the present embodiment can be read out.

The processing device 71 deploys, to the volatile memory 73, a program stored on the non-volatile memory 72, and executes computation thereof. In accordance with the program, the processing device 71 performs a predetermined computation process on signals taken in from the input interface 74, the non-volatile memory 72, and the volatile memory 73.

The input interface 74 converts signals input from various types of device (the operation device 8, the posture sensor 28, etc.) into data on which computation can be performed by the processing device 71. In addition, the output interface 75 generates output signals corresponding to results of computation performed by the processing device 71, and outputs the signals to various types of device (the first selector valve 15*a*, the second selector valve 15*b*, the first regulator 2, the second regulator 4, etc.).

Figure 11:
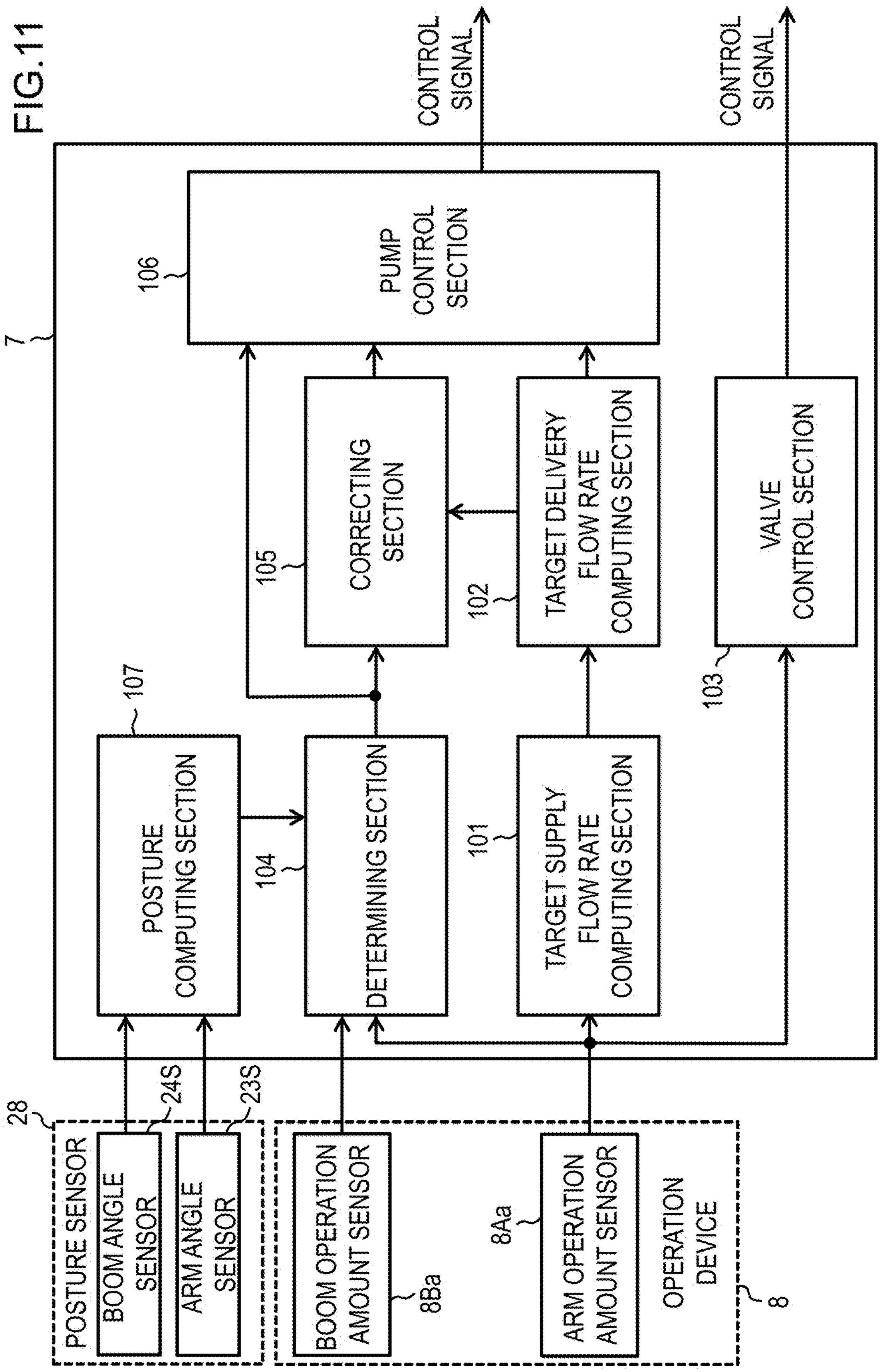
FIG. 11 is a functional block diagram of the controller according to the fourth embodiment.

FIG. 11 is a functional block diagram of the controller 7. As depicted in FIG. 11, by executing programs stored on the non-volatile memory 72, the controller 7 functions as the target supply flow rate computing section 101, the target delivery flow rate computing section 102, the valve control section 103, the determining section 104, the correcting section 105, the pump control section 106, and a posture computing section 107.

Note that, for convenience of explanation, it is assumed, in the case explained hereinbelow, that the rotation speed of the engine 5 is a fixed value. As described above, the delivery flow rates of the closed-circuit pump 1 and the open-circuit pump 3 are determined according to the delivery capacities and the rotation speed of the engine 5. The controller 7 controls the delivery flow rates of the closed-circuit pump 1 and the open-circuit pump 3 by controlling the delivery capacities of the closed-circuit pump 1 and the open-circuit pump 3.

The target supply flow rate computing section 101 computes, on the basis of the operation amount of the arm operation lever 8Ab sensed by the arm operation amount sensor 8Aa, a target value (hereinafter, written as a target supply flow rate) of the flow rate of the hydraulic working fluid to be supplied to the arm cylinder 26.

The non-volatile memory 72 has stored thereon a supply flow rate table that defines the relationship between the operation amount and the target supply flow rate. The supply flow rate table defines such supply flow rate characteristics that the target supply flow rate increases as the operation amount increases.

The target supply flow rate computing section 101 refers to the supply flow rate table stored on the non-volatile memory 72, and computes the target supply flow rate on the basis of the operation amount sensed by the arm operation amount sensor 8Aa.

On the basis of the target supply flow rate computed by the target supply flow rate computing section 101, the target delivery flow rate computing section 102 computes the target flow rate Q1, which is a target value of the delivery flow rate of the closed-circuit pump 1, and the target flow rate Q2, which is a target value of the delivery flow rate of the open-circuit pump 3.

Similarly to the first embodiment, the non-volatile memory 72 has stored thereon the first delivery flow rate table and the second delivery flow rate table depicted in FIG. 5.

As depicted in FIG. 11, the valve control section 103 identifies the operation direction of the arm operation lever 8Ab on the basis of a sensing result of the arm operation amount sensor 8Aa.

Where the operation direction of the arm operation lever 8Ab is the arm crowding direction, the valve control section 103 outputs an ON signal to the first selector valve 15*a*, and also outputs an OFF signal to the second selector valve 15*b*. Thereby, the first selector valve 15*a* gets positioned at the open position, and the second selector valve 15*b* gets positioned at the closed position.

Where the operation direction of the arm operation lever 8Ab is the arm dumping direction, the valve control section 103 outputs an ON signal to the second selector valve 15*b*, and also outputs an OFF signal to the first selector valve 15*a*. Thereby, the second selector valve 15*b* gets positioned at the open position, and the first selector valve 15*a* gets positioned at the closed position.

Note that the ON signals are equivalent to control signals (control currents) for exciting the solenoids of the first selector valve 15*a* and the second selector valve 15*b*, and switching the first selector valve 15*a* and the second selector valve 15*b* to the open positions. The OFF signals are control signals (control currents) equivalent to standby currents.

Figure 12:
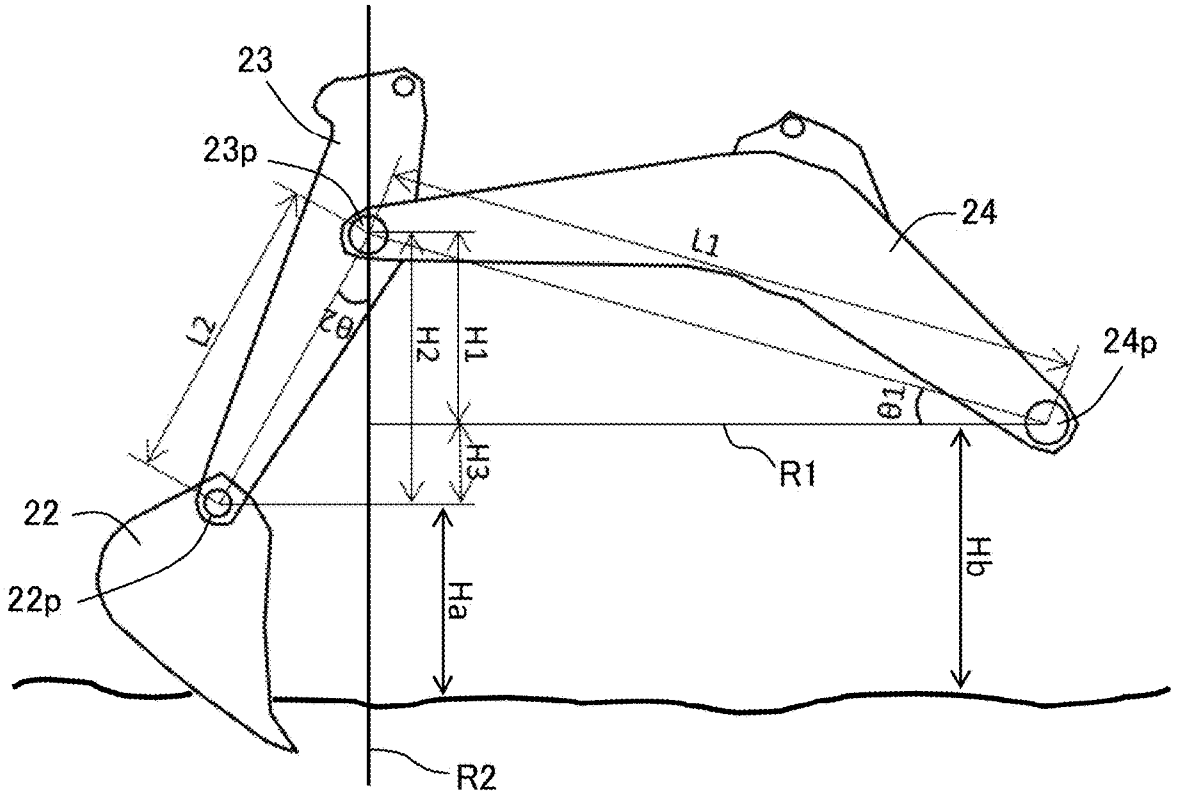
FIG. 12 is a figure for explaining an example of a process of computing a posture of a work device.

The posture computing section 107 computes the posture of the work device 20 on the basis of a signal from the posture sensor 28. An example of a process of computing the posture of the work device 20 performed by the posture computing section 107 is explained with reference to FIG. 12. As depicted in FIG. 12, on the basis of a signal from the boom angle sensor 24S, the posture computing section 107 computes a pivot angle (hereinafter, written also as a boom angle) 01 from a first reference plane R1 of the boom 24. On the basis of a signal from the arm angle sensor 23S, the posture computing section 107 computes a pivot angle (hereinafter, written also as an arm angle) 02 from a second reference plane R2 of the arm 23.

The first reference plane R1 is a horizontal plane, for example. In this case, the second reference plane R2 is a vertical plane orthogonal to the first reference plane (horizontal plane) R1. In addition, the second reference plane R2 may be a plane parallel to a swing center axis Ca (see FIG. 1) of the swing structure 40, for example. In this case, the second reference plane R2 is a plane orthogonal to the first reference plane R1, that is, a plane parallel to the advancing direction of the travel structure 30.

The posture computing section 107 computes, on the basis of the boom angle θ1, the arm angle θ2, dimensions L1 and L2 of the work device 20 stored on the non-volatile memory 72, and the like, a height (hereinafter, written also as an arm leading end height) Ha of the leading end position of the arm 23 from a ground.

The posture computing section 107 computes, on the basis of the following formula (1A), a distance H1 in the vertical axis direction from the center position of a boom pin (also called a foot pin) 24*p* to the center position of an arm pin 23*p*.

$$H1 = L1 \times \sin\theta 1 \quad (1A)$$

Here, L1 is the dimension (boom length) of a line segment linking the center position of the boom pin 24*p* and the center position of the arm pin 23*p*. The center position of the boom pin 24*p* is the pivot center of the boom 24, and the center position of the arm pin 23*p* is the pivot center of the arm 23.

The posture computing section 107 computes, on the basis of the following Formula (2A), a distance H2 in the vertical axis direction from the center position of a bucket pin 22*p* to the center position of the arm pin 23*p*.

$$H2 = L2 \times \cos\theta 2 \quad (2A)$$

Here, L2 is the dimension (arm length) of a line segment linking the center position of the bucket pin 22*p* and the center position of the arm pin 23*p*. The center position of the bucket pin 22*p* is the pivot center of the bucket 22.

The posture computing section 107 computes, on the basis of the following Formula (3A), an arm leading end height Ha, which is the distance in the vertical axis direction from the ground to the center position of the arm pin 23*p*.

$$Ha = Hb - H3 \quad (3A)$$

H3 is computed in accordance with the following Formula (4A).

$$H3 = H2 - H1 \quad (4A)$$

Here, Hb is the distance (hereinafter, written also as a boom foot height) in the vertical axis direction from the ground to the center position of the boom pin 24*p*, and is stored on the non-volatile memory 72 in advance.

The hydraulic excavator 100 performs excavation of a ground on a deck installed on the ground, in some cases. In this case, the boom foot height Hb is specified taking into consideration the height of the deck from the ground. Note that, since the heights of decks differ depending on work sites, an operator is preferably allowed to vary a boom foot height Ha0. For example, the controller 7 varies the height threshold Ha0 stored on the non-volatile memory 72 on the basis of information input from an input device provided in the operation room 41 when the input device is operated by an operator. The input device is a touch panel monitor, a switch box having a plurality of switches, or the like.

The determining section 104 depicted in FIG. 11 determines whether or not the excavation work is being performed by the work device 20, on the basis of a computation result of the posture computing section 107, and signals from the arm operation amount sensor 8Aa and the boom operation amount sensor 8Ba. Hereinbelow, details of an example of the determination method is explained.

The determining section 104 determines whether or not the leading end of the work device 20 (the leading end of the bucket 22) is positioned below the ground, on the basis of the distance H1, the distance H2, and the arm leading end height Ha computed by the posture computing section 107.

The determining section 104 determines whether or not the arm leading end height Ha is equal to or smaller than the distance H3 (=H2−H1). Where the arm leading end height Ha is equal to or smaller than the distance H3, the determining section 104 determines that the leading end of the work device 20 is positioned below the ground. Where the arm leading end height Ha is greater than the distance H3, the determining section 104 determines that the leading end of the work device 20 is positioned above the ground.

The posture of the work device 20 at the time when the leading end of the work device 20 is positioned below a ground is a ground-excavating posture. Because of this, the determining section 104 functions as a posture determining section that determines whether or not the posture of the work device 20 is the ground-excavating posture, on the basis of the computation result of the posture computing section 107.

The determining section 104 determines whether or not a excavating operation is being performed, on the basis of signals from the operation device 8. Hereinbelow, details are explained.

The determining section 104 determines whether or not a boom raising operation is being performed, on the basis of the signal from the boom operation amount sensor 8Ba. The determining section 104 determines that the boom raising operation is being performed when the operation amount in a boom raising direction is equal to or greater than a raising operation amount threshold. The determining section 104 determines that the boom raising operation is not being performed when the operation amount in the boom raising direction is smaller than the raising operation amount threshold. The raising operation amount threshold is stored on the non-volatile memory 72.

The determining section 104 determines whether or not an arm crowding operation is being performed, on the basis of the signal from the arm operation amount sensor 8Aa. The determining section 104 determines that the arm crowding operation is being performed when the operation amount in the arm crowding direction is equal to or greater than a crowding operation amount threshold. The determining section 104 determines that the arm crowding operation is not being performed when the operation amount in the arm crowding direction is smaller than the crowding operation amount threshold. The crowding operation amount threshold is stored on the non-volatile memory 72.

The determining section 104 determines that the excavating operation is being performed by the operation device 8 when it is determined that at least either the boom raising operation or the arm crowding operation is being performed. That is, the determining section 104 determines that the excavating operation is being performed by the operation device 8 when any of single operation of the boom raising, single operation of the arm crowding, and combined operation of the boom raising and the arm crowding is performed. The determining section 104 determines that the excavating operation is not being performed by the operation device 8 when it is determined that neither the boom raising operation or the arm crowding operation is being performed.

The determining section 104 determines that the excavation work is being performed by the work device 20 (hereinafter, this state is written also as an excavation state), and turns on an excavation flag when the leading end of the work device 20 is positioned below the ground, and it is determined that the excavating operation is being performed.

The determining section 104 determines that the excavation work is not being performed by the work device 20 (hereinafter, this state is written also as a non-excavation state), and turns off the excavation flag when it is determined that the leading end of the work device 20 is positioned above the ground. The determining section 104 determines that the hydraulic excavator 100 is in the non-excavation state and turns off the excavation flag when it is determined that the excavating operation is not being performed.

The determining section 104 executes the excavation flag setting process while repeating the process at predetermined control intervals. That is, the determining section 104 has a function to perform monitoring to determine whether or not the hydraulic excavator 100 is in the excavation state, and sense the state of transitions between the non-excavation state and the excavation state.

When the determining section 104 determines that the hydraulic excavator 100 is in the excavation state, the correcting section 105 computes the correction target flow rate Q1c of the closed-circuit pump 1 and the correction target flow rate Q2c of the open-circuit pump 3 on the basis of the target flow rate Q1 of the closed-circuit pump 1, the target flow rate Q2 of the open-circuit pump 3, and the delivery flow rate Q3 of the charge pump 9.

The correcting section 105 computes the adjustment flow rate Qa on the basis of the target flow rate Q1, the target flow rate Q2, and the delivery flow rate Q3 of the charge pump 9. The adjustment flow rate Qa is computed in accordance with the following Formula (5A).

$$Qa = [Q1 - (Q2 + Q3)]/2 \quad (5A)$$

Q1 is the target flow rate of the closed-circuit pump 1 computed by the target delivery flow rate computing section 102, Q2 is the target flow rate of the open-circuit pump 3 computed by the target delivery flow rate computing section 102, and Q3 is the delivery flow rate of the charge pump 9. The delivery flow rate Q3 of the charge pump 9 is stored on the non-volatile memory 72.

The correcting section 105 computes the correction target flow rate Q1c on the basis of the target flow rate Q1 and the adjustment flow rate Qa. The correction target flow rate Q1c is computed in accordance with the following Formula (6A).

$$Q1c = Q1 - Qa \tag{6A}$$

The correcting section 105 computes the correction target flow rate Q2c on the basis of the target flow rate Q2 and the adjustment flow rate Qa. The correction target flow rate Q2c is computed in accordance with the following Formula (7A).

$$Q2c = Q2 + Qa \tag{7A}$$

Qa is a value which is half of a shortfall in the return fluid to return to the closed-circuit pump 1 as represented by Formula (5A).

The pump control section 106 outputs, to the first regulator 2, a control signal for making the delivery flow rate of the closed-circuit pump 1 the target flow rate Q1 computed by the target delivery flow rate computing section 102, when the determining section 104 determines that the hydraulic excavator 100 is in the non-excavation state. That is, the pump control section 106 controls the delivery capacity of the closed-circuit pump 1 via the first regulator 2 such that the delivery flow rate of the closed-circuit pump 1 becomes the target flow rate Q1.

The pump control section 106 outputs, to the second regulator 4, a control signal for making the delivery flow rate of the open-circuit pump 3 the target flow rate Q2 computed by the target delivery flow rate computing section 102, when the determining section 104 determines that the hydraulic excavator 100 is in the non-excavation state. That is, the pump control section 106 controls the delivery capacity of the open-circuit pump 3 via the second regulator 4 such that the delivery flow rate of the open-circuit pump 3 becomes the target flow rate Q2.

The pump control section 106 outputs, to the first regulator 2, a control signal for making the delivery flow rate of the closed-circuit pump 1 the correction target flow rate Q1c computed by the correcting section 105, when the determining section 104 determines that the hydraulic excavator 100 is in the excavation state. That is, the pump control section 106 controls the delivery capacity of the closed-circuit pump 1 via the first regulator 2 such that the delivery flow rate of the closed-circuit pump 1 becomes the correction target flow rate Q1c.

The pump control section 106 outputs, to the second regulator 4, a control signal for making the delivery flow rate of the open-circuit pump 3 the correction target flow rate Q2c computed by the correcting section 105, when the determining section 104 determines that the hydraulic excavator 100 is in the excavation state. That is, the pump control section 106 controls the delivery capacity of the open-circuit pump 3 via the second regulator 4 such that the delivery flow rate of the open-circuit pump 3 becomes the correction target flow rate Q2c.

Accordingly, when there is a transition from the non-excavation state to the excavation state, the pump control section 106 increases the delivery capacity of the open-circuit pump 3 as compared to that when the hydraulic excavator 100 is in the non-excavation state, and also reduces the delivery capacity of the closed-circuit pump 1. Thereby, along with increasing the delivery flow rate of the open-circuit pump 3, the delivery flow rate of the closed-circuit pump 1 decreases.

Note that, if there is a transition from the excavation state to the non-excavation state, the pump control section 106 reduces the delivery capacity of the open-circuit pump 3 as compared to that when the hydraulic excavator 100 is in the excavation state, and also increases the delivery capacity of the closed-circuit pump 1. Thereby, along with decreasing the delivery flow rate of the open-circuit pump 3, the delivery flow rate of the closed-circuit pump increases.

An example of the excavation determination process executed by the controller 7 is explained with reference to FIG. 13. A process depicted in a flowchart in FIG. 13 is started by an ignition switch, which is not depicted, being turned on, and is repeatedly executed at predetermined control intervals after initial setting, which is not depicted, is performed.

Figure 13:
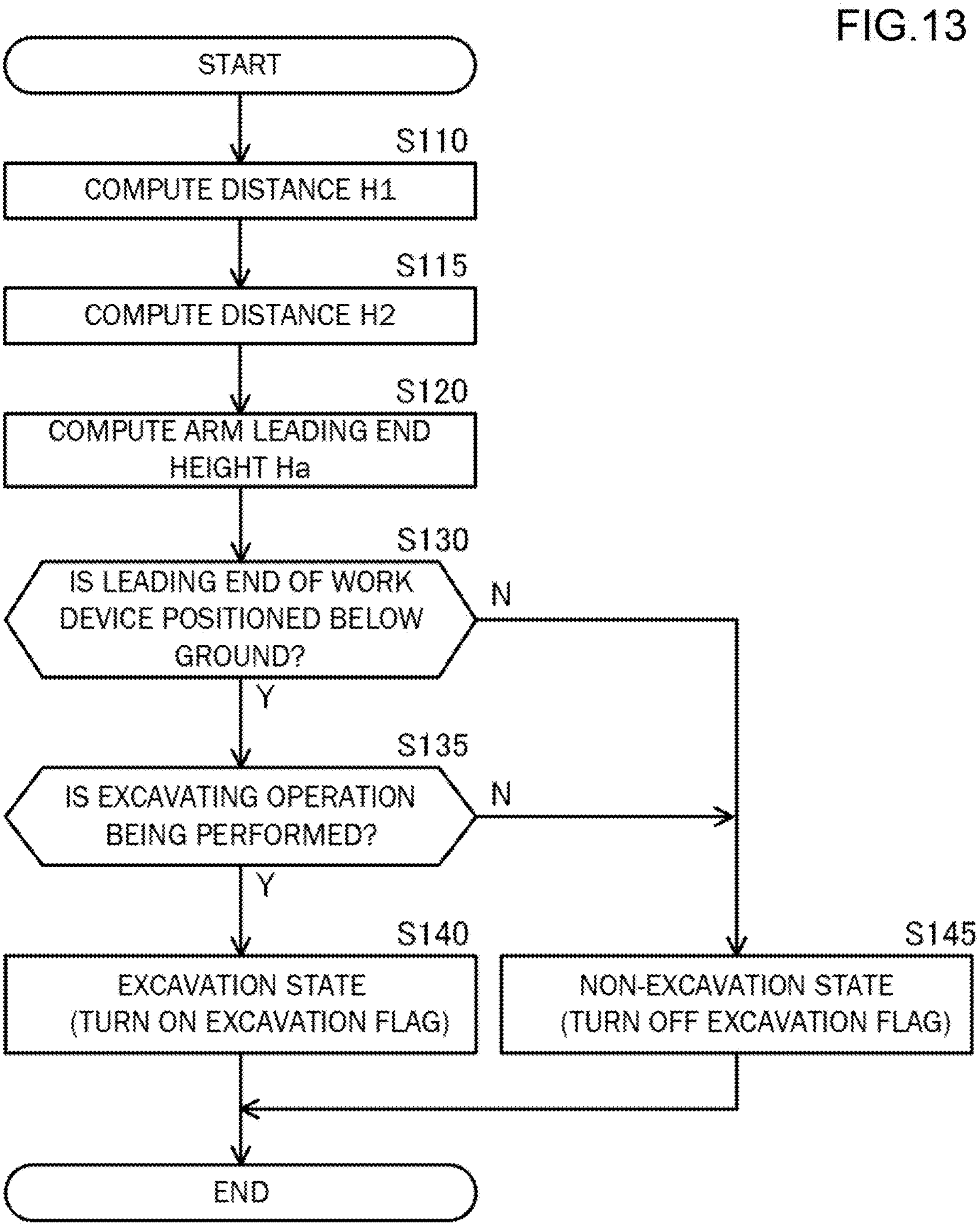
FIG. 13 is a flowchart depicting an example of an excavation determination process executed by the controller according to the fourth embodiment.

As depicted in FIG. 13, at Step S110, the posture computing section 107 computes the boom angle θ1 on the basis of the sensing result of the boom angle sensor 24S. The posture computing section 107 computes the distance H1 on the basis of the computed boom angle θ1 and the boom length L1 stored on the non-volatile memory 72, and the process proceeds to Step S115.

At Step S115, the posture computing section 107 computes the arm angle θ2 on the basis of the sensing result of the arm angle sensor 23S. The posture computing section 107 computes the distance H2 on the basis of the computed arm angle θ2 and the arm length L2 stored on the non-volatile memory 72, and the process proceeds to Step S120.

At Step S120, the posture computing section 107 computes the arm leading end height Ha on the basis of the distances H1 and H2 computed at Steps S110 and S115 and the boom foot height Hb stored on the non-volatile memory 72, and the process proceeds to Step S130.

At Step S130, on the basis of results of the computation at Steps S110 to S120, the determining section 104 determines whether or not the leading end of the work device 20 is positioned below the ground, that is, whether or not the posture of the work device 20 is the ground-excavating posture.

At Step S130, the determining section 104 determines that the leading end of the work device 20 is positioned below the ground, that is, the posture of the work device 20 is the ground-excavating posture when the arm leading end height Ha is equal to or smaller than the determination distance H3 (=H2−H1), and the process proceeds to Step S135.

At Step S130, the determining section 104 determines that the leading end of the work device 20 is not positioned below the ground, that is, the posture of the work device 20 is not the ground-excavating posture when the arm leading end height Ha is greater than the determination distance H3 (=H2−H1), and the process proceeds to Step S145.

At Step S135, the determining section 104 determines whether or not the excavating operation is performed, on the basis of the signal from the operation device 8. The determining section 104 determines whether or not the boom raising operation is being performed, on the basis of the signal from the boom operation amount sensor 8Ba. The determining section 104 determines whether or not the arm crowding operation is being performed, on the basis of the signal from the arm operation amount sensor 8Aa.

At Step S135, the determining section 104 determines that the excavating operation is being performed by the operation device 8 when it is determined that at least either the boom raising operation or the arm crowding operation is being performed.

At Step S135, the determining section 104 determines that the excavating operation is not being performed by the operation device 8 when it is determined that neither the boom raising operation or the arm crowding operation is being performed.

When it is determined at Step S135 that the excavating operation is being performed, the process proceeds to Step S140, and when it is determined at Step S135 that the excavating operation is not being performed, the process proceeds to Step S145.

At Step S140, the determining section 104 determines that the excavation work is being performed by the work device 20 (excavation state), the determining section 104 turns on the excavation flag.

At Step S145, the determining section 104 determines that the excavation work is not being performed by the work device 20 (non-excavation state), and the determining section 104 turns off the excavation flag.

When the excavation flag setting process (Steps S140 and S145) ends, the process depicted in the flowchart in FIG. 13 in the current control period ends. That is, when the processes of Steps S140 and S145 end, the process of Step S110 is executed for the next control period.

An example of flow control executed by the controller 7 is explained with reference to FIG. 14. A process depicted in a flowchart in FIG. 14 is started by an ignition switch, which is not depicted, being turned on, and is repeatedly executed at predetermined control intervals after initial setting, which is not depicted, is performed.

Figure 14:
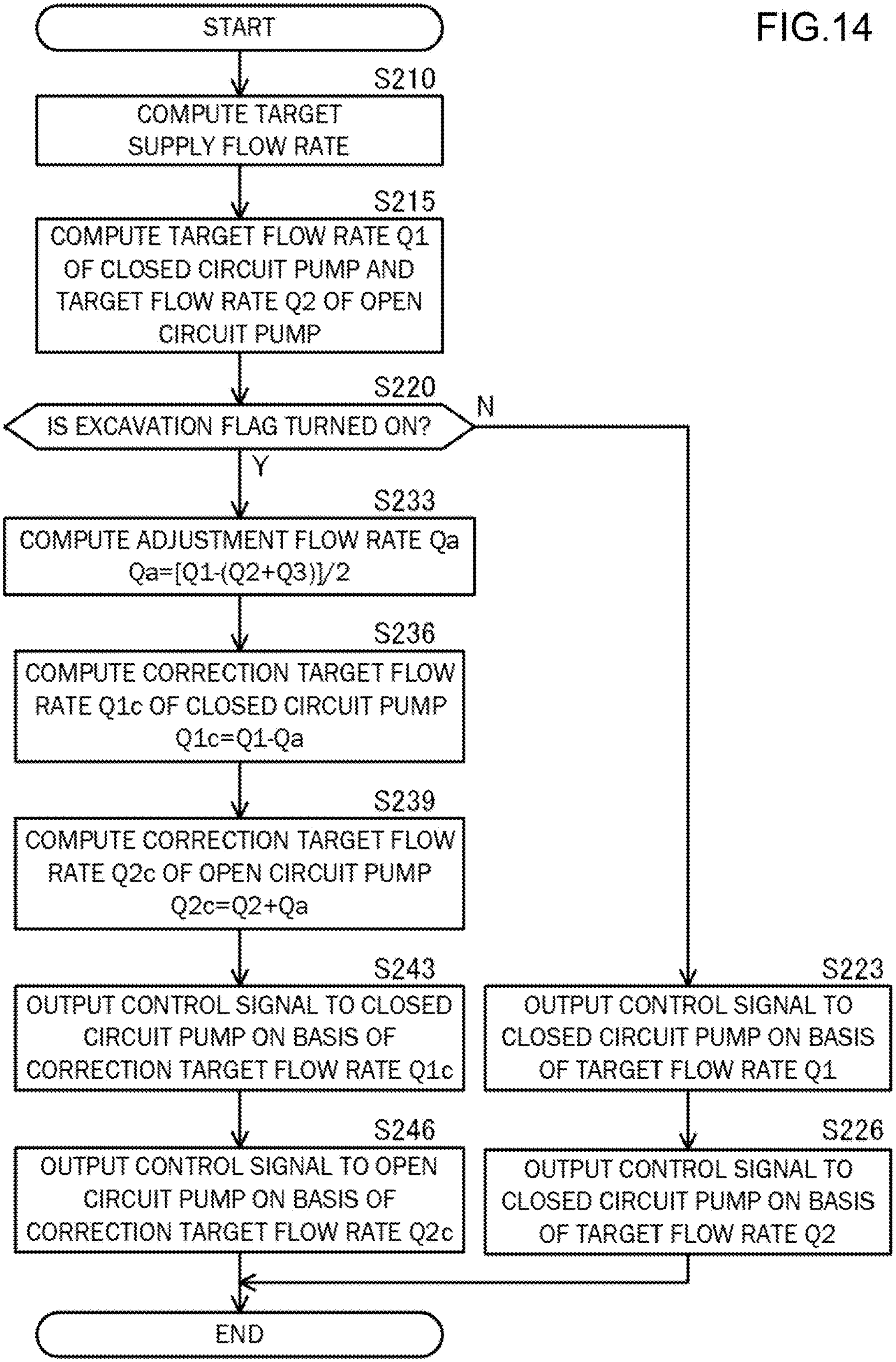
FIG. 14 is a flowchart depicting an example of flow control executed by the controller according to the fourth embodiment.

As depicted in FIG. 14, at Step S210, on the basis of the operation amount sensed by the arm operation amount sensor 8Aa, the target supply flow rate computing section 101 computes the target supply flow rate of the hydraulic working fluid to be supplied to the arm cylinder 26, and also identifies the operation direction of the arm operation lever 8Ab, and the process proceeds to Step S215.

At Step S215, the target delivery flow rate computing section 102 computes the target flow rate Q1 of the closed-circuit pump 1 and the target flow rate Q2 of the open-circuit pump 3 on the basis of the target supply flow rate computed at Step S210, and the process proceeds to Step S220.

At Step S220, the determining section 104 determines whether or not the excavation flag is turned on. When it is determined at Step S220 that the excavation flag is turned on, the process proceeds to Step S233, and when it is determined at Step S220 that the excavation flag is not turned on, the process proceeds to Step S223.

At Step S223, the pump control section 106 outputs, to the first regulator 2 of the closed-circuit pump 1, a control signal corresponding to the target flow rate Q1 computed at Step S215, and the process proceeds to Step S226.

At Step S226, the pump control section 106 outputs, to the second regulator 4 of the open-circuit pump 3, a control signal corresponding to the target flow rate Q2 computed at Step S215.

In addition, although not depicted, at Step S226, the valve control section 103 outputs, to the first selector valve 15*a* and the second selector valve 15*b*, control signals corresponding to the operation direction identified at Step S210.

The controller 7 ends the process depicted in the flowchart in FIG. 14 in the current control period when the process of Step S226 is ended. That is, when the process of Step S226 ends, the process of Step S210 is executed for the next control period.

At Step S233, the correcting section 105 computes the adjustment flow rate Qa on the basis of the target flow rate Q1 and the target flow rate Q2 that are computed at Step S215 and the delivery flow rate Q3 of the charge pump 9, and the process proceeds to Step S236.

At Step S236, the correcting section 105 computes the correction target flow rate Q1c on the basis of the target flow rate Q1 computed at Step S215 and the adjustment flow rate Qa computed at Step S233, and the process proceeds to Step S239.

At Step S239, the correcting section 105 computes the correction target flow rate Q2c on the basis of the target flow rate Q2 computed at Step S215 and the adjustment flow rate Qa computed at Step S233, and the process proceeds to Step S243.

At Step S243, the pump control section 106 outputs, to the first regulator 2 of the closed-circuit pump 1, a control signal corresponding to the correction target flow rate Q1c computed at Step S236, and the process proceeds to Step S246.

At Step S246, the pump control section 106 outputs, to the second regulator 4 of the open-circuit pump 3, a control signal corresponding to the correction target flow rate Q2c computed at Step S239.

In addition, although not depicted, at Step S246, the valve control section 103 outputs, to the first selector valve 15*a* and the second selector valve 15*b*, control signals corresponding to the operation direction identified at Step S210. When the process of Step S246 is ended, the controller 7 ends the process depicted in the flowchart in FIG. 14 in the current control period.

In this manner, in the present embodiment, in the excavation state, control (hereinafter, written also as flow rate adjustment control) is executed such that the delivery capacity (tilting angle) of the open-circuit pump 3 is increased as compared to that in the non-excavation state, and the delivery capacity (tilting angle) of the closed-circuit pump 1 is also reduced.

An example of an action of the hydraulic excavator 100 according to the present embodiment is explained. Note that, for convenience of explanation, specific numerical values are described in the explanation, but these numerical values are merely examples. It is assumed that the delivery flow rate of the charge pump 9 is 30 [L/min], the pressure-receiving area ratio between the bottom-side fluid chamber 26*a* and rod-side fluid chamber 26*b* of the arm cylinder 26 is 1:0.7, and the set pressure of the charge relief valve 65 is 2.0 [MPa].

When an operator operates the arm operation lever 8Ab toward the arm crowding side, the controller 7 computes the target supply flow rate.

The controller 7 computes the target flow rate Q1 of the closed-circuit pump 1 and the target flow rate Q2 of the open-circuit pump 3 on the basis of the target supply flow rate. The controller 7 outputs control signals corresponding to a result of the computation to the first regulator 2 and the second regulator 4.

In addition, the controller 7 outputs an ON signal to the first selector valve 15*a*, and switches the first selector valve 15*a* to the open position. Note that the controller 7 outputs an OFF signal to the second selector valve 15b, and makes the second selector valve 15b stay at the closed position.

Here, in the case to be explained as an example, it is assumed that the target supply flow rate is 100 [L/min], the target flow rate Q1 of the closed-circuit pump 1 is 80 [L/min], and the target flow rate Q2 of the open-circuit pump 3 is 20 [L/min]. Where the hydraulic excavator 100 is in the non-excavation state, the controller 7 controls the first regulator 2 and the second regulator 4 such that the delivery flow rate of the closed-circuit pump 1 becomes 80 [L/min], and the delivery flow rate of the open-circuit pump 3 becomes 20 [L/min].

Where the flow rate of the hydraulic working fluid supplied to the bottom-side fluid chamber 26a of the arm cylinder 26 is 100 [L/min], the flow rate of the hydraulic working fluid discharged from the rod-side fluid chamber 26b is 70 [L/min] according to the pressure-receiving area difference between the bottom-side fluid chamber 26a and the rod-side fluid chamber 26b. Note that the flow rate of the hydraulic working fluid supplied from the closed circuit Cc to the charge flow path 11 through the flushing valve 16 is 0 [L/min].

The required flow rate of the hydraulic working fluid to return to the closed-circuit pump 1 is 80 [L/min], which is the same as the delivery flow rate. Because of this, 10 [L/min] of the hydraulic working fluid in the hydraulic working fluid delivered from the charge pump 9 is added to the second flow path 62 from the charge flow path 11 through the second makeup valve 66b. Note that the remaining 20 [L/min] of the hydraulic working fluid which is not added to the second flow path 62 in the hydraulic working fluid delivered from the charge pump 9 is discharged from the charge relief valve 65 to the tank 17.

The hydraulic working fluid is supplied to the bottom-side fluid chamber 26a of the arm cylinder 26, and the hydraulic working fluid is discharged from the rod-side fluid chamber 26b of the arm cylinder 26 to extend the arm cylinder 26. Note that the extension speed of the arm cylinder 26 is determined according to the flow rate of the hydraulic working fluid supplied to the bottom-side fluid chamber 26a and the pressure-receiving area of the bottom-side fluid chamber 26a. Extension of the arm cylinder 26 causes the arm 23 to perform an action toward the arm crowding side.

In contrast, when the excavation work is being performed, an event such as contact of the bucket 22 with a hard soil occurs in some cases. When the bucket 22 contacts a hard soil during the excavation, the crowding action of the arm 23 is restricted. For example, the crowding action of the arm 23 is decelerated or stopped. When the extending action of the arm cylinder 26 is restricted, the flow rate of the hydraulic working fluid discharged from the rod-side fluid chamber 26b to the second flow path 62 decreases.

For example, when the crowding action of the arm 23 is stopped, the flow rate of the hydraulic working fluid discharged from the rod-side fluid chamber 26b to the second flow path 62 becomes 0 [L/min]. The delivery flow rate of the charge pump 9 is 30 [L/min].

Note that, in the present embodiment, the hydraulic working fluid delivered from the open-circuit pump 3 to the first flow path 61 is introduced to the charge flow path 11 through the flushing valve 16. However, if it is supposed that the flow rate adjustment control is not executed, the flow rate of the return fluid to return to the closed-circuit pump 1 is 50 [L/min], which is the total of the delivery flow rate 30 [L/min] of the charge pump 9 and the delivery flow rate 20 [L/min] of the open-circuit pump 3, and falls short of 80 [L/min], which is the required flow rate of the return fluid to return to the closed-circuit pump 1.

If the return fluid to return to the closed-circuit pump 1 becomes insufficient, there is a fear that cavitation occurs because the pressure on the return side of the closed-circuit pump 1 temporarily becomes a negative pressure, to deteriorate the closed-circuit pump 1. In addition, if the return fluid to return to the closed-circuit pump 1 becomes insufficient, there is a fear that a flow rate required for lubricating movable sections such as gears or bearings of the closed-circuit pump 1 cannot be temporarily ensured. As a result, there is a fear that galling occurs at the movable sections to deteriorate the movable sections.

If the pressures of the charge flow path 11 and the second flow path 62 lower due to the insufficiency of the return fluid to return to the closed-circuit pump 1, the pressure difference between the bottom-side fluid chamber 26a and rod-side fluid chamber 26b of the arm cylinder 26 increases. As a result, the cylinder thrust of the arm cylinder 26 increases, and the operational feeling changes undesirably.

Furthermore, if the cylinder thrust increases, the load acting on a portion where driven members of the work device 20 are coupled with each other also increases. Because of this, there is a fear that the stress generated at a welded portion or the like of the portion where the driven members of the work device 20 are coupled with each other increases, and the lifetime of the coupling portion decreases.

In view of this, in order to prevent the occurrence of these problems, in the excavation state, the controller 7 according to the present embodiment increases the delivery flow rate of the open-circuit pump 3 as compared to that in the non-excavation state, and also reduces the delivery flow rate of the closed-circuit pump 1. Thus, it is possible to ensure the required flow rate of the return fluid to return to the closed-circuit pump 1 when an action of the arm cylinder 26 is restricted.

In a state where an action of the arm cylinder 26 is forcibly stopped due to contact of the bucket 22 with a hard soil, the flushing valve 16 is switched to the first direction D1 due to the difference between the pressure of the bottom-side fluid chamber 26a and the pressure of the rod-side fluid chamber 26b. Thereby, the flushing valve 16 establishes communication between the first flow path 61 and the charge flow path 11. Accordingly, the hydraulic working fluid delivered from the open-circuit pump 3 is introduced as an excess fluid to the charge flow path 11 through the flushing valve 16.

When an action of the arm cylinder 26 is restricted, the controller 7 computes, as the adjustment flow rate Qa, half of a shortfall in the flow rate of the hydraulic working fluid. The shortfall in the flow rate of the hydraulic working fluid is determined in the following manner, supposing that the flow rate adjustment control is not executed.

The flow rate of the hydraulic working fluid introduced from the charge flow path 11 to the second flow path 62 through the second makeup valve 66b is 50 [L/min], which is obtained by adding together the delivery flow rate 30 [L/min] of the charge pump 9 and the delivery flow rate 20 [L/min] of the open-circuit pump 3. Accordingly, a shortfall in the return fluid to return to the closed-circuit pump 1 is 30 [L/min] (=80 [L/min]-50 [L/min]).

Even where an action of the arm cylinder 26 is restricted, the controller 7 according to the present embodiment executes the flow rate adjustment control in the excavation state, in order to make the delivery amount and suction amount of the closed-circuit pump 1 the same. In the flow rate adjustment control, the controller 7 increases the delivery flow rate of the open-circuit pump 3 by 15 [L/min] (=30 [L/min]/2) as compared to that in the non-excavation state, and also reduces the delivery amount of the closed-circuit pump 1 by 15 [L/min] (=30 [L/min]/2).

Specifically, the controller 7 computes, as the adjustment flow rate Qa, half of the shortfall 30 [L/min] in the flow rate of the hydraulic working fluid. The controller 7 computes the correction target flow rate Q2c=35 [L/min], which is a value obtained by adding the adjustment flow rate Qa=15 [L/min] to the target flow rate 20 [L/min] of the open-circuit pump 3. In addition, the controller 7 computes the correction target flow rate Q1c gives=65 [L/min], which is a value obtained by subtracting the adjustment flow rate Qa=15 [L/min] from the target flow rate 80 [L/min] of the closed-circuit pump 1.

The controller 7 controls the first regulator 2 such that the delivery flow rate of the closed-circuit pump 1 becomes the correction target flow rate Q1c=65 [L/min]. The controller 7 controls the second regulator 4 such that the delivery flow rate of the open-circuit pump 3 becomes the correction target flow rate Q2c=35 [L/min].

In a state where an action of the arm cylinder 26 is not being restricted during excavation, the flow rate of the hydraulic working fluid supplied to the bottom-side fluid chamber **26*a* of the arm cylinder 26 is the total value 100 [L/min] of the delivery flow rate 65 [L/min] of the closed-circuit pump 1 and the delivery flow rate 35 [L/min] of the open-circuit pump 3. The flow rate of the return fluid of the closed-circuit pump 1 is the total value 100 [L/min] of the flow rate 70 [L/min] of the hydraulic working fluid discharged from the rod-side fluid chamber 26*b* of the arm cylinder 26 and the delivery flow rate 30 [L/min] of the charge pump 9**.

In a state where the bucket 22 contacts a hard soil, and an action of the arm cylinder 26 is stopped during excavation, the flow rate of the hydraulic working fluid discharged from the rod-side fluid chamber **26*b* of the arm cylinder 26 is 0 [L/min]. However, the flow rate of the hydraulic working fluid introduced from the charge flow path 11 to the second flow path 62 through the second makeup valve 66*b* becomes 65 [L/min], which is obtained by adding together the delivery flow rate 30 [L/min] of the charge pump 9 and the delivery flow rate 35 [L/min] of the open-circuit pump 3. Since the delivery flow rate of the closed-circuit pump 1 is 65 [L/min], the required flow rate of the return fluid of the closed-circuit pump 1** is ensured.

The present fourth embodiment described above achieves the following actions and effects.

(1A) The hydraulic excavator (work machine) 100 includes: the articulated work device 20 that has a plurality of hydraulic actuators (the boom cylinder 27, the arm cylinder 26, and the bucket cylinder 25), and performs the excavation work; the posture sensor 28 that senses the posture of the work device 20; the operation device 8 for operating the work device 20; the closed-circuit pump 1 that is connected to the arm cylinder 26 in the closed circuit Cc, and supplies and discharges the hydraulic working fluid to and from the arm cylinder 26; the open-circuit pump 3 that is connected to the arm cylinder 26 in the open circuit Oc, and supplies the hydraulic working fluid to the arm cylinder 26; the charge pump 9; the charge flow path 11 that introduces the hydraulic working fluid delivered from the charge pump 9 to the closed circuit Cc; the flushing valve (excess fluid discharging device) 16 that discharges an excess hydraulic working fluid of the closed circuit Cc to the charge flow path 11; and the controller 7 that controls the delivery capacities of the closed-circuit pump 1 and the open-circuit pump 3.

The controller 7 determines the posture of the work device 20 or the height of the leading end of the work device 20 on the basis of the signal from the posture sensor 28. On the basis of the signal from the operation device 8 in a state where the posture of the work device 20 or the height of the leading end of the work device 20 satisfies a predetermined condition, the controller 7 determines whether or not the excavation work is being performed by the work device 20 (the excavation state). In the present embodiment, the predetermined condition described above is satisfied when the leading end of the work device 20 is positioned below the ground. The controller 7 according to the present embodiment computes data (H1, H2, H3, and Ha) representing the posture of work device 20, and, on the basis of results of the computation, determines whether or not the predetermined condition described above is satisfied. When there is a transition from a state where the excavation work is not being performed by the work device 20 (the non-excavation state) to a state where the excavation work is being performed by the work device 20 (the excavation state), the controller 7 increases the delivery capacity of the open-circuit pump 3 as compared to that before the transition, and also reduces the delivery capacity of the closed-circuit pump 1. In the excavation state, along with increasing the flow rate of the hydraulic working fluid delivered from the open-circuit pump 3 as compared to the flow rate in the non-excavation state, the flow rate of the hydraulic working fluid delivered from the closed-circuit pump 1 decreases.

This configuration can prevent the return fluid of the closed-circuit pump 1 from being insufficient even when an action of the arm cylinder 26 is restricted for such reasons as that the bucket 22 contacts a hard soil during excavation. As a result, it is possible to prevent the occurrence of cavitation or galling caused by the insufficiency of the return fluid of the closed-circuit pump 1.

Accordingly, the present embodiment can provide the hydraulic excavator (work machine) 100 that can inhibit the deterioration of the closed-circuit pump 1 caused by cavitation or galling.

(2A) In addition, the present embodiment can prevent changes in the cylinder thrust of the arm cylinder 26 caused by the insufficiency of the return fluid of the closed-circuit pump 1. As a result, it is possible to prevent changes in the operational feeling.

(3A) Furthermore, the present embodiment can inhibit the increase in the load acting on a portion where driven members of the work device 20 are coupled with each other, or the like by preventing the increase in the cylinder thrust of the arm cylinder 26 caused by the insufficiency of the return fluid of the closed-circuit pump 1. As a result, it is possible to inhibit the decrease in the lifetime of the work device 20.

(4A) The controller 7 determines whether or not the excavating operation is being performed, on the basis of the signal from the operation device 8, and also determines whether or not the leading end of the bucket 22 (the leading end of the work device 20) is positioned below the ground, on the basis of the signal from the posture sensor 28. The controller 7 determines that the excavation work is being performed by the work device 20 when the leading end of the bucket 22 is positioned below the ground and the excavating operation is being performed. The controller 7 determines that the excavation work is not being performed by the work device 20 when the leading end of the bucket 22 is positioned above the ground. In addition, the controller 7 determines that the excavation work is not being performed by the work device 20 when the excavating operation is not being performed.

According to this configuration, the flow rate adjustment control is executed while excavation is being performed below the ground. Thus, even if the bucket 22 contacts a hard soil, and an action of the arm cylinder 26 is restricted during excavation below the ground, it is possible to prevent the return fluid of the closed-circuit pump 1 from being insufficient.

(5A) The controller 7 increases the delivery capacity of the open-circuit pump 3, and also reduces the delivery capacity of the closed-circuit pump 1 such that the total value of the delivery flow rate of the closed-circuit pump 1 and the delivery flow rate of the open-circuit pump 3 is maintained, when there is a transition from a state where the excavation work is not being performed by the work device 20 to a state where the excavation work is performed by the work device 20 (Steps S233, S236, S239, S243, and S246 in FIG. 14).

According to this configuration, the total value (100 [L/min]) of the delivery flow rate (80 [L/min]) of the closed-circuit pump 1 and the delivery flow rate (20 [L/min]) of the open-circuit pump 3 in the non-excavation state becomes the same as the total value (100 [L/min]) of the delivery flow rate (65 [L/min]) of the closed-circuit pump 1 and the delivery flow rate (35 [L/min]) of the open-circuit pump 3 in the excavation state. Thereby, the work device 20 can be caused to perform an action at a speed intended by an operator in each of the excavation state and the non-excavation state.

(6A) In addition, the flow rate of the return fluid of the closed-circuit pump 1 is the same between a state where the bucket 22 contacts a hard soil and an action of the arm 23 is restricted and a state where the bucket 22 has excavated the hard soil. Because of this, it is possible to prevent the occurrence of a shock in an action of the work device 20 after a hard soil is excavated.

Modification examples like the ones below are also within the scope of the present invention.

Modification Example 1

In the first embodiment, the example is explained in which the controller 7 computes, as the target flow rate of the open-circuit pump 3, a value obtained by subtracting the delivery flow rate of the charge pump 9 from the target flow rate of the closed-circuit pump 1 when it is determined that the charge pressure Pc sensed by the pressure sensor 10 is lower than the pressure threshold Pc0, but the present invention is not limited to this.

The target flow rate of the open-circuit pump 3 may be set to a value lower than that in the first embodiment within such a range that deterioration caused by the insufficiency of the return fluid of the closed-circuit pump 1 is unlikely to occur. In addition, in the first embodiment, the controller 7 may slightly reduce the delivery flow rate of the closed-circuit pump 1.

Modification Example 2

In the second embodiment, the example is explained in which an increase amount of the target flow rate of the open-circuit pump 3 and a decrease amount of the target flow rate of the closed-circuit pump 1 at the time when the charge pressure Pc sensed by the pressure sensor 10 has lowered to be lower than the pressure threshold Pc0 from equal to or higher than the pressure threshold Pc0 are the same, but the present invention is not limited to this. The increase amount of the target flow rate of the open-circuit pump 3 and the decrease amount of the target flow rate of the closed-circuit pump 1 may not match each other as long as they are within such a range that deterioration caused by the insufficiency of the return fluid of the closed-circuit pump 1 is unlikely to occur.

Modification Example 3

In the third embodiment, the example is explained in which a value obtained by adding the delivery flow rate of the charge pump 9 to the target flow rate of the open-circuit pump 3 is computed as the target flow rate of the closed-circuit pump 1 when the charge pressure Pc sensed by the pressure sensor 10 has lowered to be lower than the pressure threshold Pc0 from equal to or higher than the pressure threshold Pc0, but the present invention is not limited to this.

The target flow rate of the closed-circuit pump 1 may be set to a value higher than that in the third embodiment within such a range that deterioration caused by the insufficiency of the return fluid of the closed-circuit pump 1 is unlikely to occur. In addition, in the third embodiment, the controller 7 may slightly increase the delivery flow rate of the open-circuit pump 3.

Modification Example 4

In the first embodiment, the example is explained in which the correcting section 105 computes the correction target flow rate Q2c when the determining section 104 determines that the charge pressure Pc is lower than the pressure threshold Pc0, but the present invention is not limited to this. For example, the process of Step S130 in FIG. 6 may be executed between Step S115 and Step S120. That is, the correcting section 105 may always compute the correction target flow rate Q2c.

Modification Example 5

In the second embodiment, the example is explained in which the correcting section 105 computes the correction target flow rates Q1c and Q2c when the determining section 104 determines that the charge pressure Pc is lower than the pressure threshold Pc0, but the present invention is not limited to this. For example, the processes of Steps S233, S236, and S239 in FIG. 7 may be executed between Step S115 and Step S120. That is, the correcting section 105 may always compute the correction target flow rates Q1c and Q2c.

Modification Example 6

In the third embodiment, the example is explained in which the correcting section 105 computes the correction target flow rate Q1c when the determining section 104 determines that the charge pressure Pc is lower than the pressure threshold Pc0, but the present invention is not limited to this. For example, the process of Step S330 in FIG. 8 may be executed between Step S115 and Step S120. That is, the correcting section 105 may always compute the correction target flow rate Q1c.

Modification Example 7

In the fourth embodiment, the example is explained in which the increase amount of the target flow rate of the open-circuit pump 3 and the decrease amount of the target flow rate of the closed-circuit pump 1 are the same at the time when there is a transition from the non-excavation state to the excavation state, but the present invention is not limited to this. The increase amount of the target flow rate of the open-circuit pump 3 and the decrease amount of the target flow rate of the closed-circuit pump 1 may not match each other within such a range that deterioration caused by the insufficiency of the return fluid of the closed-circuit pump 1 is unlikely to occur.

Modification Example 8

In the fourth embodiment, the example is explained in which the controller 7 determines that the leading end of the work device 20 is positioned below the ground when the arm leading end height Ha is equal to or smaller than the distance H3, but the present invention is not limited to this. It is sufficient if the controller 7 determines the posture of the work device 20, and determines that hydraulic excavator 100 is in the excavation work state in a case where the excavating operation is being performed when the posture of the work device 20 satisfies the predetermined condition described above. Note that, as described above, the above-described predetermined condition includes that the leading end of the work device 20 is positioned below the ground. In addition, the controller 7 may determine the height of the leading end of the work device 20, and determine that the hydraulic excavator 100 is in the excavation work state in a case where the excavating operation is being performed when the height of the leading end of the work device 20 satisfies a predetermined condition.

Modification Example 8-1

Specifically, for example, the controller 7 may determine that the leading end of the bucket 22 is positioned below the ground when the arm leading end height Ha, which is data representing the posture of the work device 20, is equal to or smaller than the height threshold Ha0. In this example, the controller 7 determines that the leading end of the bucket 22 is positioned above the ground when the arm leading end height Ha is greater than the height threshold Ha0. The height threshold Ha0 is stored on the non-volatile memory 72 in advance.

As described above, the hydraulic excavator 100 performs excavation of a ground on a deck installed on the ground in some cases. In this case, the height threshold Ha0 is specified by taking into consideration the height of the deck from the ground. Note that, since the heights of decks differ depending on work sites, preferably, an operator is allowed to vary the height threshold Ha0. For example, the controller 7 varies the height threshold Ha0 stored on the non-volatile memory 72 on the basis of information input from an input device provided in the operation room 41 when the input device is operated by an operator.

Modification Example 8-2

In addition, the controller 7 may compute the height of the leading end of the bucket 22 on the basis of the signal from the posture sensor 28, and determine that the leading end of the bucket 22 is positioned below the ground when a result of the computation is a negative value. In this case, the posture sensor 28 includes a posture sensor (angle sensor) that senses the pivot angle of the bucket 22.

Modification Example 9

In the fourth embodiment, the example is explained in which it is determined that the excavation work is being performed by the work device 20 when the leading end of the bucket 22 is positioned below the ground and the excavating operation is being performed, but the present invention is not limited to this.

For example, the controller 7 may determine whether or not a scraping work, which is a wall-surface-excavating work, is being performed by the work device 20. The controller 7 determines that the scraping work is being performed by the work device 20 when the work device 20 is at a posture to perform the scraping work, and the operation for performing scraping is being performed.

The controller 7 determines whether or not the posture of the work device 20 is at a posture to perform the scraping work on the basis of the signal from the posture sensor 28. For example, the controller 7 determines that the posture of the work device 20 is a posture to perform the scraping work when the leading end of the bucket 22 is at a distance from the swing center axis Ca, which distance is equal to or greater than a predetermined distance.

In addition, the controller 7 determines whether or not the operation for performing scraping, that is, the wall-surface-excavating operation, is being performed, on the basis of the signals from the boom operation amount sensor 8Ba and the arm operation amount sensor 8Aa. For example, the controller 7 determines that the wall-surface-excavating operation is being performed by the operation device 8 when at least either a boom lowering operation or the arm crowding operation is being performed. The controller 7 determines that the wall-surface-excavating operation is not being performed by the operation device 8 when neither the boom lowering operation nor the arm crowding operation is being performed.

According to this configuration, the flow rate adjustment control is executed while excavation is being performed into a wall surface. Thus, even when the bucket 22 contacts a hard soil, and an action of the arm cylinder 26 is restricted during excavation of the inside of the wall surface, it is possible to prevent the return fluid of the closed-circuit pump 1 from being insufficient.

Modification Example 10

In the fourth embodiment, the example is explained in which the correcting section 105 computes the correction target flow rates Q1c and Q2c when the excavation flag is turned on, but the present invention is not limited to this. For example, the processes of Steps S233, S236, and S239 in FIG. 14 may be executed between Step S215 and Step S220. That is, the correcting section 105 may always compute the correction target flow rates Q1c and Q2c.

Modification Example 11

In the fourth embodiment, the example is explained in which, when there is a transition from the non-excavation state to the excavation state, the controller 7 increases the delivery capacity of the open-circuit pump 3 as compared to that before the transition, and also reduces the delivery capacity of the closed-circuit pump 1. However, the controller 7 can be configured such that, when there is a transition from the non-excavation state to the excavation state, it execute at least either the capacity-increasing control of increasing the delivery capacity of the open-circuit pump 3 as compared to that before the transition or the capacity-reducing control of reducing the delivery capacity of the closed-circuit pump 1 as compared to that before the transition.

Modification Example 12

In the above-described embodiments, the examples of the first selector valve 15*a* and the second selector valve 15*b* being solenoid selector valves are explained, but the present invention is not limited to this. Instead of the first selector valve 15*a* and the second selector valve 15*b*, the hydraulic system 60 may include a first solenoid proportional valve and a second solenoid proportional valve that can adjust the flow rate of the hydraulic working fluid delivered from the open-circuit pump 3, and introduce the hydraulic working fluid to the closed circuit Cc.

Modification Example 13

In the above-described embodiments, the examples of the first selector valve 15*a* and the second selector valve 15*b* being provided separately, but the present invention is not limited to this. Instead of the first selector valve 15*a* and the second selector valve 15*b*, the hydraulic system 60 may include one spool valve having the functions of the first selector valve 15*a* and the second selector valve 15*b*.

Modification Example 14

In the above-described embodiments, the flow control in a case where an action of the arm cylinder 26 is restricted is explained, but the present invention is not limited to this. The hydraulic circuits of the boom cylinder 27 and the bucket cylinder 25 may be given configurations similar to that of the hydraulic circuit of the arm cylinder 26, and, in the hydraulic circuits of the boom cylinder 27 and the bucket cylinder 25, the controllers 7 may execute flow control similar to that in the above-described embodiments.

In addition, the hydraulic actuators are not limited to hydraulic cylinders. For example, in the first to third embodiments, the controller 7 may execute flow control similar to that in the above-described embodiments when the charge pressure has lowered due to restriction of an action of a hydraulic motor such as the swing motor 42.

As described above, the controller 7 of the work machine according to the above-described embodiments increases the delivery capacity of the open-circuit pump 3 or reduces the delivery capacity of the closed-circuit pump 1 when the state of the pressure of the charge flow path 11 has transited to be lower than the pressure threshold Pc0 from equal to or higher than the predetermined pressure threshold Pc0 or when the state of the work device 20 has transited to a state of performing the excavation work from a state of not-performing the excavation work. This configuration can prevent the return fluid of the closed-circuit pump 1 from being insufficient even when an action of a hydraulic actuator is restricted due to contact of the work device 20 with a hard soil during excavation, or the like. As a result, it is possible to prevent the occurrence of cavitation or galling caused by the insufficiency of the return fluid of the closed-circuit pump 1. Accordingly, according to this configuration, a work machine that can inhibit deterioration of the closed-circuit pump 1 caused by cavitation or galling can be provided.

Whereas embodiments of the present invention have been explained thus far, the above-described embodiments are depicted merely as some of application examples of the present invention, and it is not aimed to limit the technical scope of the present invention to the specific configurations of the embodiments described above.

The embodiments and modification examples described above are illustrated for explaining the present invention in an easy-to-understand manner, and the present invention is not necessarily limited to ones including all constituent elements explained. In addition, some of the constituent elements of an embodiment or a modification example can be replaced with constituent elements of another embodiment or modification example, and, in addition, a constituent element of an embodiment or a modification example can also be added to the constituent elements of another embodiment or modification example. Note that control lines and information lines depicted in figures are ones that are considered to be necessary for explanation, and all control lines and information lines that are necessary for products are not necessarily depicted. It may be considered that actually almost all constituent elements are interconnected.

DESCRIPTION OF REFERENCE CHARACTERS

1: Closed-circuit pump
2: First regulator
3: Open-circuit pump
4: Second regulator
5: Engine
7: Controller
8: Operation device
**8*a***: Operation amount sensor
**8*b***: Operation lever
8A: Arm operation device
8Aa: Arm operation amount sensor
8Ab: Arm operation lever
8B: Boom operation device
8Ba: Boom operation amount sensor
8Bb: Boom operation lever
9: Charge pump
10: Pressure sensor
11: Charge flow path
**15*a***: First selector valve
**15*b***: Second selector valve
16: Flushing valve (excess fluid discharging device)
17: Tank
20: Work device
22: Bucket
23: Arm
24: Boom
25: Bucket cylinder (hydraulic actuator)
26: Arm cylinder (hydraulic actuator)
**26*a***: Bottom-side fluid chamber
**26*b***: Rod-side fluid chamber
27: Boom cylinder (hydraulic actuator)
28: Posture sensor
30: Travel structure
31: Travel motor (hydraulic actuator)
40: Swing structure (machine body)
42: Swing motor (hydraulic actuator)
60: Hydraulic system
61: First flow path
62: Second flow path
63: Charge circuit
65: Charge relief valve
**66*a***: First makeup valve
**66*b***: Second makeup valve
71: Processing device

72: Non-volatile memory
73: Volatile memory
74: Input interface
75: Output interface
100: Hydraulic excavator (work machine)
101: Target supply flow rate computing section
102: Target delivery flow rate computing section
103: Valve control section
104: Determining section
105: Correcting section
106: Pump control section
107: Posture computing section
Cc: Closed circuit
Oc: Open circuit

The invention claimed is:

1. A work machine comprising:

an articulated work device that has a hydraulic actuator, and performs an excavation work;

a closed-circuit pump that is connected to the hydraulic actuator in a closed circuit, and supplies and discharges a hydraulic working fluid to and from the hydraulic actuator;

an open-circuit pump that is connected to the hydraulic actuator in an open circuit, and supplies the hydraulic working fluid to the hydraulic actuator;

a charge pump;

a charge flow path that introduces the hydraulic working fluid delivered from the charge pump to the closed circuit; and a controller that controls a delivery capacity of the closed-circuit pump and a delivery capacity of the open-circuit pump, wherein the work machine includes an excess fluid discharging device that discharges an excess hydraulic working fluid of the closed circuit to the charge flow path, and a pressure sensor that senses a pressure of the charge flow path, and the controller is configured to increase the delivery capacity of the open-circuit pump when the pressure of the charge flow path sensed by the pressure sensor has lowered to be lower than a predetermined pressure threshold from equal to or higher than the pressure threshold.

2. The work machine according to claim 1, wherein the controller is configured to increase the delivery capacity of the open-circuit pump while maintaining the delivery capacity of the closed-circuit pump when the pressure of the charge flow path sensed by the pressure sensor has lowered to be lower than the pressure threshold from equal to or higher than the pressure threshold.

3. The work machine according to claim 1, wherein the controller is configured to compute, as a target value of a delivery flow rate of the open-circuit pump, a value obtained by subtracting a delivery flow rate of the charge pump from a target value of a delivery flow rate of the closed-circuit pump, when the pressure of the charge flow path sensed by the pressure sensor has lowered to be lower than the pressure threshold from equal to or higher than the pressure threshold, and control the delivery capacity of the open-circuit pump on a basis of the computed target value of the delivery flow rate of the open-circuit pump.

4. The work machine according to claim 1, wherein the controller is configured to increase the delivery capacity of the open-circuit pump, and also reduce the delivery capacity of the closed-circuit pump, when the pressure of the charge flow path sensed by the pressure sensor has lowered to be lower than the pressure threshold from equal to or higher than the pressure threshold.

5. The work machine according to claim 4, wherein the controller is configured to increase the delivery capacity of the open-circuit pump, and also reduce the delivery capacity of the closed-circuit pump such that a total value of a delivery flow rate of the closed-circuit pump and a delivery flow rate of the open-circuit pump is maintained, when the pressure of the charge flow path sensed by the pressure sensor has lowered to be lower than the pressure threshold from equal to or higher than the pressure threshold.

6. The work machine according to claim 4, wherein the controller is configured to compute, as a target value of a delivery flow rate of the closed-circuit pump, a value obtained by adding a delivery flow rate of the charge pump to a target value of a delivery flow rate of the open-circuit pump, when the pressure of the charge flow path sensed by the pressure sensor has lowered to be lower than the pressure threshold from equal to or higher than the pressure threshold, and control the delivery capacity of the closed-circuit pump on a basis of the computed target value of the delivery flow rate of the closed-circuit pump.

7. A work machine comprising:

an articulated work device that has a hydraulic actuator, and performs an excavation work;

a closed-circuit pump that is connected to the hydraulic actuator in a closed circuit, and supplies and discharges a hydraulic working fluid to and from the hydraulic actuator;

an open-circuit pump that is connected to the hydraulic actuator in an open circuit, and supplies the hydraulic working fluid to the hydraulic actuator;

a charge pump;

a charge flow path that introduces the hydraulic working fluid delivered from the charge pump to the closed circuit; and a controller that controls a delivery capacity of the closed-circuit pump and a delivery capacity of the open-circuit pump, wherein the work machine includes an excess fluid discharging device that discharges an excess hydraulic working fluid of the closed circuit to the charge flow path, a posture sensor that senses a posture of the work device, and an operation device for operating the work device, and the controller is configured to:

determine the posture of the work device or a height of a leading end of the work device on a basis of a signal from the posture sensor, determine whether or not the excavation work is being performed by the work device, on a basis of a signal from the operation device in a state where the posture of the work device or the height of the leading end of the work device satisfies a predetermined condition, and, when a state of the excavation work not being performed by the work device has transited to a state of the excavation work being performed by the work device, increase the delivery capacity of the open-circuit pump, and reduce the delivery capacity of the closed-circuit pump.

8. The work machine according to claim 7, wherein the controller is configured to determine whether or not an excavating operation is being performed, on a basis of a signal from the operation device, also determine whether or not the leading end of the work device is positioned below a ground, on a basis of a signal from the posture sensor, and determine that the excavation work is being performed by the work device, when the leading end of the work device is positioned below the ground and the relevant excavating operation is being performed.

9. The work machine according to claim 7, wherein the controller is configured to increase the delivery capacity of the open-circuit pump, and also reduce the delivery capacity of the closed-circuit pump such that a total value of a delivery flow rate of the closed-circuit pump and a delivery flow rate of the open-circuit pump is maintained, when the state of the excavation work not being performed by the work device has transited to the state of the excavation work being performed by the work device.

10. The work machine according to claim 7, wherein the controller is configured to determine whether or not the excavating operation is being performed, on a basis of a signal from the operation device, also determine whether or not the posture of the work device is an excavation posture on a basis of a signal from the posture sensor, and determine that the excavation work is being performed by the work device when the posture of the work device is the excavation posture, and the relevant excavating operation is being performed.

* * * * *